(12) United States Patent
Fenton

(10) Patent No.: US 11,868,831 B2
(45) Date of Patent: Jan. 9, 2024

(54) MEDIA CAPTURE AND MERCHANDISE PRODUCTION SYSTEM AND METHOD

(71) Applicant: James Randolph Fenton, Hermosa Beach, CA (US)

(72) Inventor: James Randolph Fenton, Hermosa Beach, CA (US)

(*) Notice: Subject to any disclaimer, the term of this patent is extended or adjusted under 35 U.S.C. 154(b) by 0 days.

(21) Appl. No.: 18/140,486

(22) Filed: Apr. 27, 2023

(65) Prior Publication Data

US 2023/0351134 A1 Nov. 2, 2023

Related U.S. Application Data

(60) Provisional application No. 63/335,339, filed on Apr. 27, 2022.

(51) Int. Cl.
*H04N 23/63* (2023.01)
*G06K 15/02* (2006.01)
*B41M 5/00* (2006.01)

(52) U.S. Cl.
CPC ....... *G06K 15/1848* (2013.01); *B41M 5/0041* (2013.01); *G06K 15/021* (2013.01); *G06K 15/1885* (2013.01); *H04N 23/635* (2023.01)

(58) Field of Classification Search
CPC ............. G06K 15/1848; G06K 15/021; G06K 15/1885; B41M 5/0041; H04N 23/635
See application file for complete search history.

(56) References Cited

U.S. PATENT DOCUMENTS 9,355,499 B1 * 5/2016 Johnson ............. H04N 1/00209

* cited by examiner

*Primary Examiner* — Yogesh K Aggarwal

(57) ABSTRACT

A system and method for capturing media and for printing the captured media onto an article of merchandise. The system includes a mobile application that overlays one or more print dielines corresponding to the printable areas of one or more types of merchandise onto an associated camera display. In this way, the system provides, prior to the capturing of the photograph, a visual indication of the subject matter within the photograph (e.g., within the overlaid print dielines) that will be cropped and printed onto the merchandise. As such, a user may properly arrange the subject matter of the photograph (e.g., people) within the print dieline prior to capturing the photograph. The system subsequently communicates the portion of the photograph within the print dieline to a printing system to print the portion onto the merchandise. The system derives the print dielines from graphic files that correspond to the merchandises' printable areas.

20 Claims, 16 Drawing Sheets

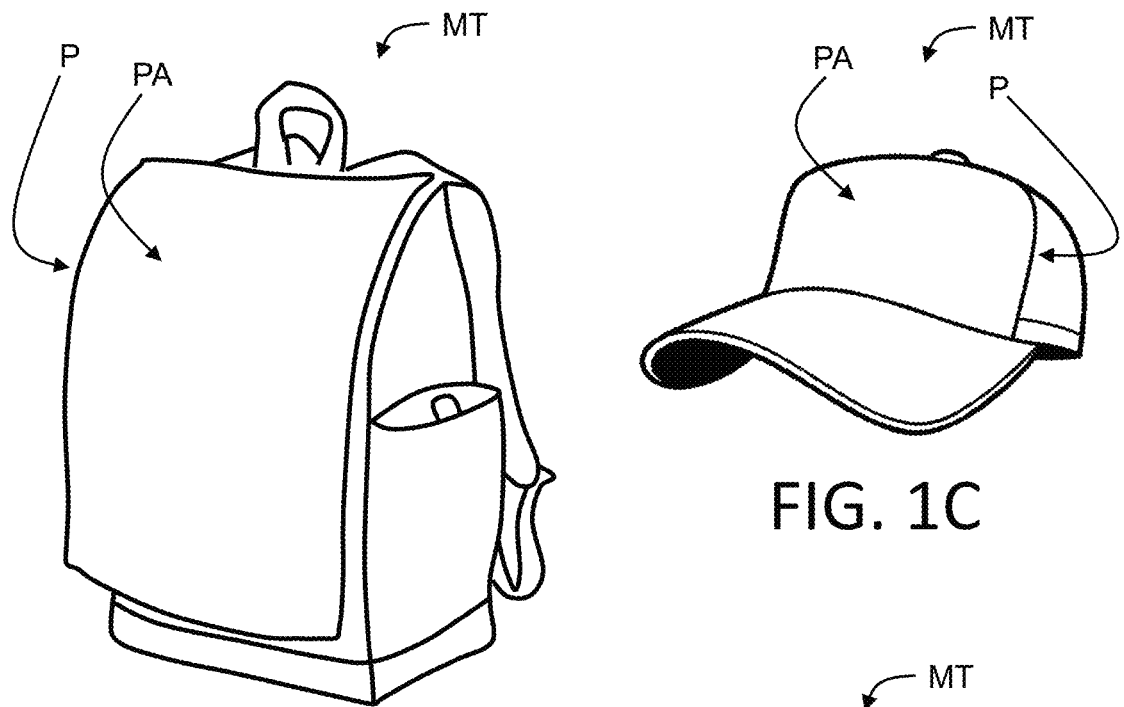
FIG. 1B
FIG. 1C
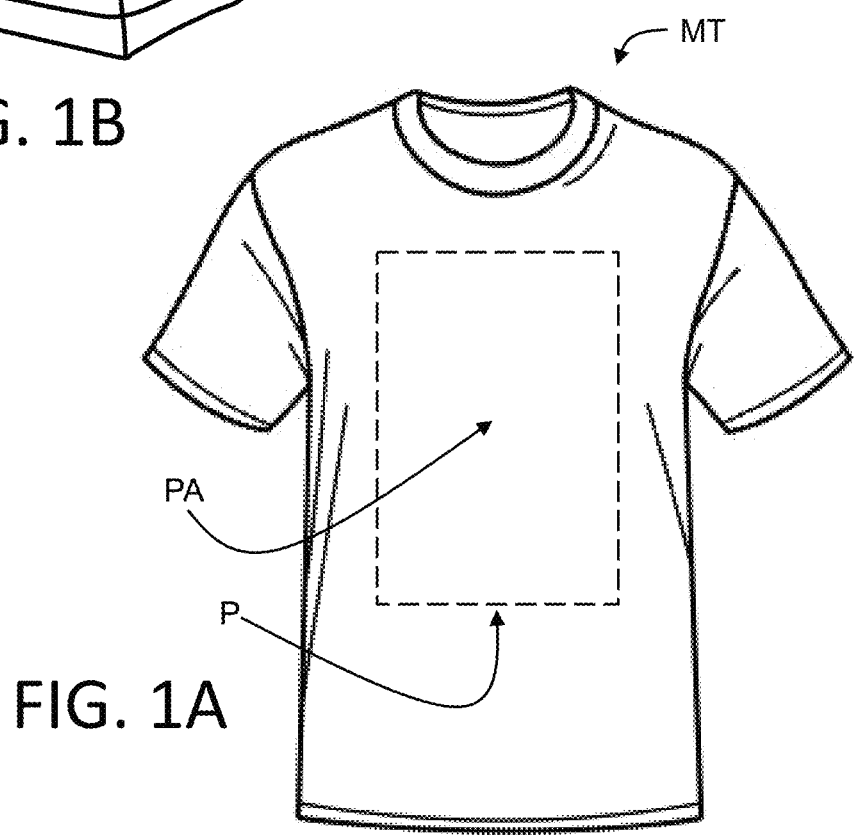
FIG. 1A

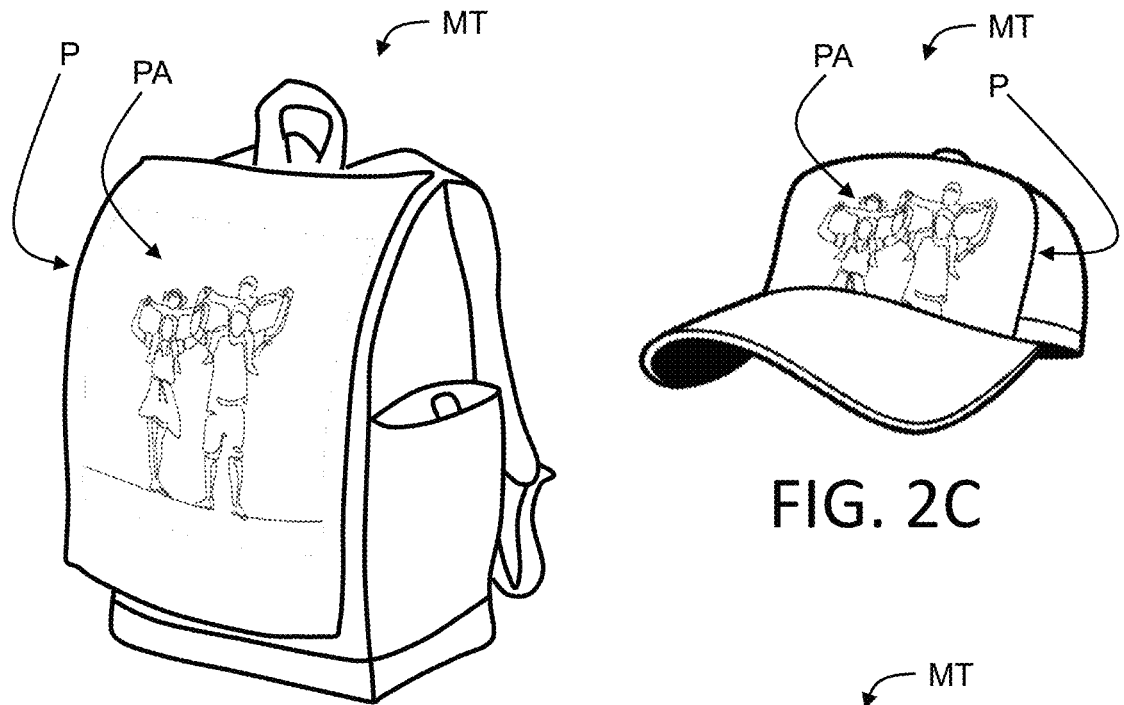
FIG. 2C
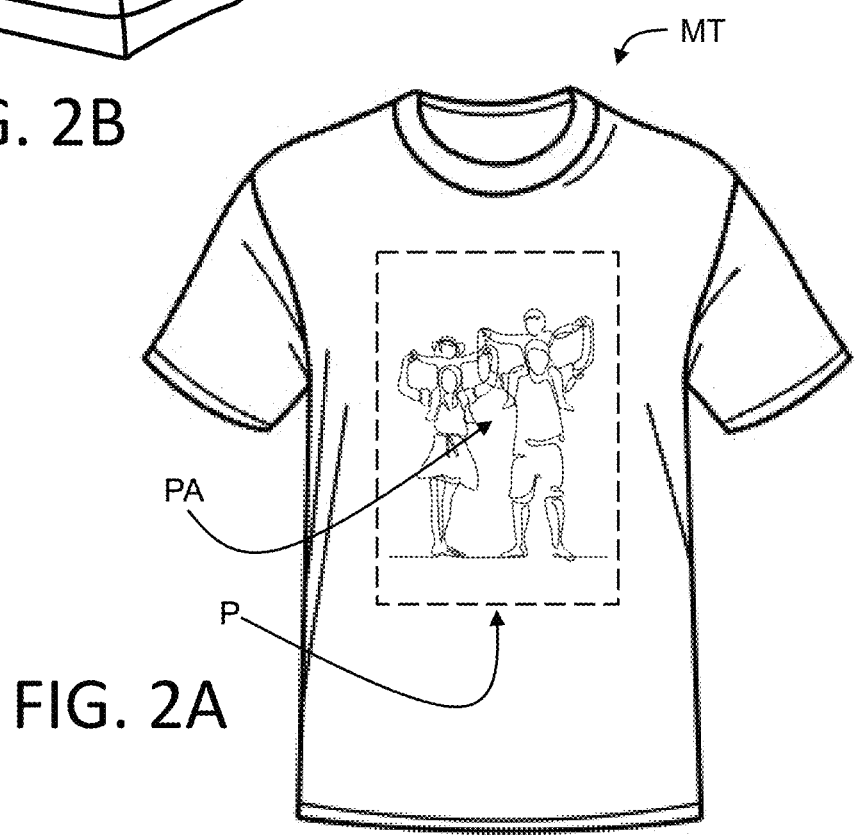
FIG. 2B
FIG. 2A

MEDIA CAPTURE AND MERCHANDISE PRODUCTION SYSTEM AND METHOD

CROSS-REFERENCE TO RELATED APPLICATIONS

This application claims priority to U.S. Provisional Application No. 63/335,339, filed Apr. 27, 2022, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF INVENTION

The field of the invention generally relates to media capture and merchandise production, including a system and method of capturing media and reproducing the media onto physical merchandise during production.

BACKGROUND OF INVENTION

Custom printed merchandise, such as backpacks, hats, and t-shirts, are extremely popular throughout the world. In many instances, a customer may have a photograph that he/she may wish to have printed onto the merchandise, and in order to do so, must upload the photograph to a system (e.g., a vendor's website) that may print it onto the desired product.

This procedure typically includes (i) finding an online vendor that provides the specific merchandise of interest, (ii) having the photograph available on an Internet connected device (e.g., computer or smartphone) to upload to the vendor's website, (iii) uploading the photograph onto the vendor's merchandise print template, (iv) manipulating the photograph on the template (e.g., repositioning, resizing, rotating, adding text, etc.), (v) viewing a digital mock-up of the customized merchandise, (vi) purchasing the product, and (vii) waiting for the product to be produced, shipped and delivered.

However, there are currently many problems associated with this process. First, because a photograph may not have been taken with the intent of printing it onto a particular product, the photograph may not be properly oriented or sized to fit well onto the product template. For example, the photograph may have been taken in landscape while the template requires portrait (or vice versa), the photograph may not have been saved with high enough resolution to be enlarged and printed without becoming pixelated (blurred), and/or the important elements shown in the photograph (e.g., the people) may not be properly grouped or aligned to all fit within the template borders. In addition, a typical wait time for such a product to be produced, shipped and delivered may be several weeks, thereby diminishing the excitement surrounding the entire activity.

In addition, many customers who may be on vacation (e.g., at a theme park, on a cruise or at a resort), or attending an exciting activity (e.g., a celebrity fundraiser, comic-con, music festival, etc.) may wish to have customized merchandize printed in real-time for use that same day, right where they are, using their own photographs taken using their own camera at the event. However, if such services are even available (which is unlikely), the customers are required to choose from a limited number of photographs taken by onsite (in-house) photographers provided by the theme park, event, etc., and are not able to use photographs taken using their own camera. In addition, the selection of available products is typically limited to simple framed prints and not actual merchandise such as backpacks, hats, and t-shirts.

Accordingly, there is a need for a system that facilitates the taking of photographs with the intent of printing the photographs onto custom printed merchandise. There is also a need for a system that optimizes the photographs specifically to be transformed onto particular products.

There also is a need for a system that enables a user to take photographs using his/her own camera for the purpose of having the photographs printed onto merchandise in real-time onsite at theme parks, events and/or at other attractions or locations.

BRIEF DESCRIPTIONS OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

FIGS. 1A-1C show aspects of articles of merchandise according to exemplary embodiments hereof;

FIGS. 2A-2C show aspects of articles of merchandise according to exemplary embodiments hereof;

DETAILED DESCRIPTION OF EXEMPLARY EMBODIMENTS

Figure 3:
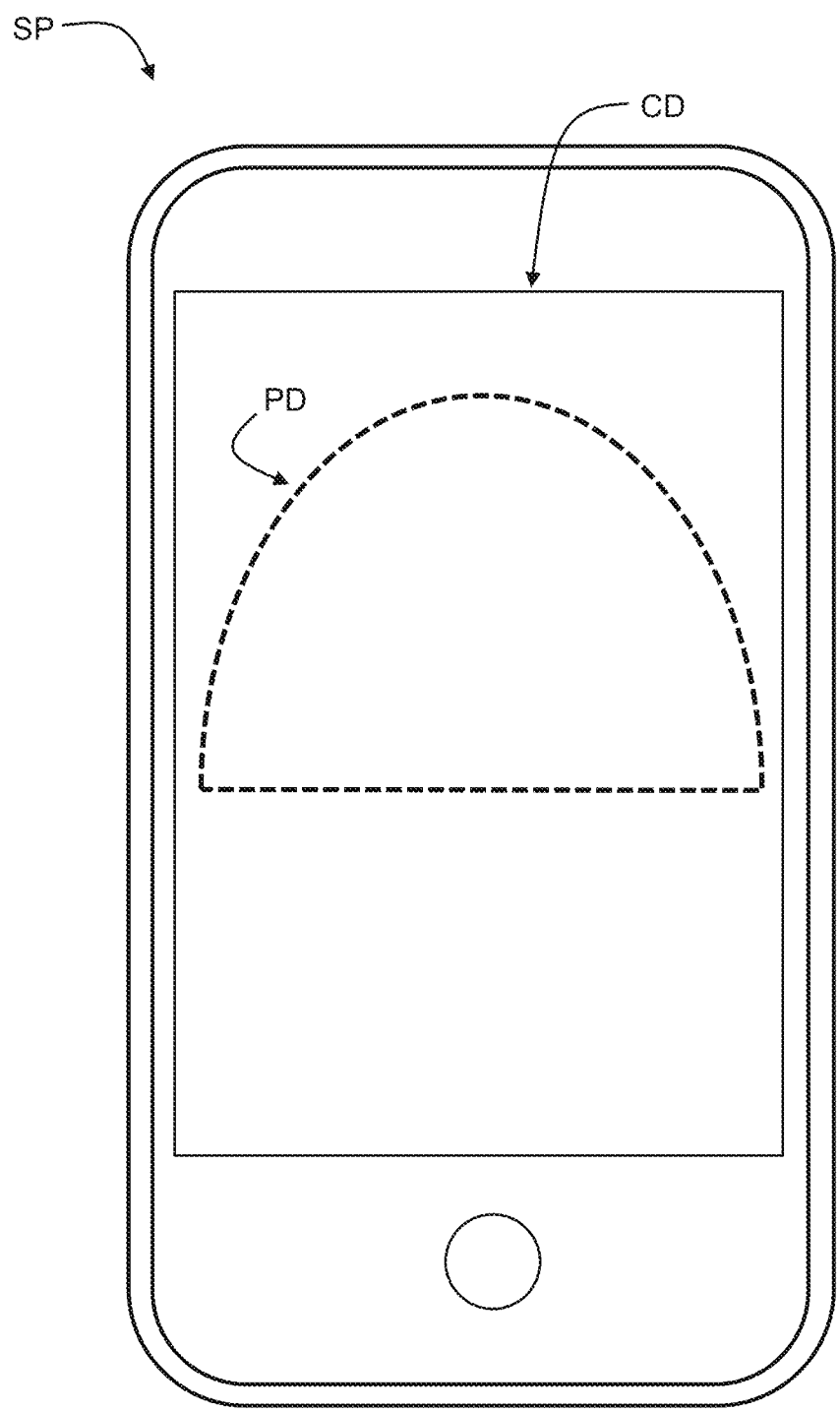
FIG. 3 shows a print dieline on a camera display according to exemplary embodiments hereof.

As used herein, unless stated otherwise, the following terms and abbreviations have the following meanings:

"Subject media" (also referred to as simply media) generally refers to any type of visual imagery that has been, or is meant to be, captured, e.g., any type of visual imagery that may be photographed, printed, scanned, copied, replicated, digitized, filmed, drawn, painted, or otherwise captured, created and/or altered. Examples include, without limitation, photographs (stills), videos, stills taken from videos, graphics, artwork, screenshots, drawings, paintings, films, stills taken from films, scans, other types of media and any combination thereof. In some embodiments, the subject media may include raw media (unaltered media), altered media (cropped, filtered, warped, color corrected, etc.), and/or any combinations thereof. For the purposes of this specification, subject media will be described primarily as photographed images, however, it is understood that the subject media may include any types of media as applicable.

"Merchandise" (also referred to as "merch") generally refers to any type of item that may be utilized by the system of the current invention, and preferably, that may be transformed by the system by printing one or more images onto the item. Merchandise may preferably include a physical item (e.g., a t-shirt), but virtual items also are contemplated. For example, in some embodiments, the system may customize merchandise by printing subject media directly onto the merch. Example merchandise may include (without limitation) backpacks, hats, t-shirts, messenger bags, sports/overnight bags, lunchboxes, guitar cases, tote bags, personal protection equipment (PPE) (such as antimicrobial or antiviral masks), socks, phone cases, keychains, postcards, posters, picture books, prints, onesies, bibs, aprons, water bottles, mugs, other types of merch, and any combinations thereof.

"Printable area" PA generally refers to one or more designated area(s) on an item of merchandise onto which subject media may be printed, sublimated, silkscreened, transferred, reproduced, overlaid, adhered, stitched, or otherwise placed. For example, as shown in FIG. 1A, a printable area PA on a t-shirt may include a designated area on the front of the shirt, while a printable area PA on a backpack, as shown in FIG. 1B, may include a blank panel dedicated for the printing of subject media. In some embodiments, the printable area PA may be removable and/or interchangeable (e.g., as with backpacks with interchangeable printable panels). In some embodiments, the printable area PA is generally defined by a printable area perimeter P within which the subject media is printed. Such a perimeter P may include any shape(s) or form(s) of any required dimensions. For example, as shown in FIG. 1A, the print area perimeter P of the t-shirt may be represented by a dashed line (with the printable area PA including the area within the dashed rectangle). In this example, the printable area perimeter P defines a printable area PA within a larger area on the merch. In another example, as shown in FIGS. 1B and 1C, the printable area perimeter P may be defined by the outer perimeter of a printable panel on a backpack (FIG. 1B), or by the outer perimeter of a printable panel on a hat (FIG. 1C). As illustrated in FIGS. 1A-1C, printable areas PA are typically communicated to a user by showing an image of the merch with the printable area PA represented by a dashed line (FIG. 1A), by corner alignment marks, using white space (FIGS. 1B and 1C), using shading or color coding, using other adequate identification methods, and/or by any combinations thereof (see "merchandise template" below). In any event, it is understood that a printable area PA and its corresponding print area perimeter P are each defined as specific shapes and with specific corresponding physical dimensions.

"Merchandise template" MT generally refers to an image of a particular unit of merchandise including an indication of a printable area PA. For example, FIG. 1A illustrates an example t-shirt merchandise template MT including a rectangular printable area PA defined by a printable area perimeter P identified on the front of the shirt by a dashed line in the form of a rectangle. In another example, FIGS. 1B and 1C illustrate example backpack and hat merchandise templates MTs, respectively, including printable areas PA defined by print area perimeters P identified on each merch item by blank white panels. By indicating the printable area PA visually, a user may better understand the exact location on the merch where a graphic may be printed, the size that the graphic will be once printed on the merch, the orientation of the graphic, etc.

"Digital mockup" generally refers to a merchandise template MT that has received subject media into the identified printable area PA (digitally superimposed or otherwise overlaid on top of the merch template) thereby visually representing what the merch may look like once printed. The purpose of digital mockup is to show a user how a particular subject media (e.g., a photograph) may look when printed onto the unit of merch. For example, FIG. 2A shows the merchandise template MT of FIG. 1A with subject media (e.g., a family picture) overlaid within the printable area PA on the t-shirt, FIG. 2B shows the merchandise template MT of FIG. 1B with subject media overlaid within the printable area PA of the backpack, and FIG. 2C shows the merchandise template MT of FIG. 1C with subject media overlaid within the printable area PA of the hat.

"Print dieline" PD (also referred to as "print area indicator") as shown in FIG. 3, generally refers to a visual representation placed onto a camera display CD (e.g., of a smartphone SP) that indicates the portion of the subject media displayed on the camera display CD that will be printed onto the printable area PA of a particular item of merchandise. That is, the print dieline PD indicates the portion of the subject media that may be identified (e.g., cropped out) and then subsequently printed onto the printable area PA within the corresponding printable area perimeter P on the corresponding item of merch. In this way, a user may align, orient, and/or otherwise adjust the camera relative to the subject media to be captured (and/or vice versa) so that the desired portion of the subject media that the user wishes to have printed onto an item of merchandise within the item's printable area PA is all displayed within the print dieline PD on the camera display CD. Once the photograph is then captured, the system may identify the portion of the subject media within the print dieline PD (e.g., crop it out) and subsequently print the portion onto the merch.

Accordingly, and in some embodiments, the print dieline PD preferably includes a proportional spatial correspondence to the printable area PA within the physical printable area perimeter P on the corresponding merch. For example, if the physical printable area PA on the item of merch includes a rectangular printable area perimeter P with a particular aspect ratio, e.g., as with the t-shirt example shown in FIGS. 1A and 2A, the print area indicator PD preferably includes a rectangular shape proportional to and with the same aspect ratio as the t-shirt's printable area perimeter P. In a second example as shown in FIG. 3, the print dieline PD that corresponds to the printable area PA within the printable area perimeter P of the hat in FIG. 1C is overlaid the camera display CD on a smartphone SP. As shown, because the printable area perimeter P on the hat includes an elongated upright half-sphere, the print dieline PD displayed on the camera display CD also includes a similarly shaped (and preferably identically shaped) elongated upright half-sphere with dimensions proportional to the hat's printable area PA. In this way, the print dieline PD shown in FIG. 3 identifies the portion of the subject media shown on the camera display CD that may be identified (e.g., cropped out once the picture is captured) and reproduced onto the hat's printable area PA.

In any of these examples, once the portion of subject media within the print dieline PD is printed (e.g., onto transfer paper to then be applied to the printable area PA on the merch), there is a one-to-one correlation between the size and shape of the printout and the size and shape of the merch item's printable area perimeter P. That is, the printout is preferably sized and shaped to exactly match the merch item's printable area PA within its print area perimeter P so that the transfer of the image onto the printable area PA may fit perfectly within the print area perimeter P. In addition, if the printing process includes direct to garment printing, the printed portion of the subject media will print directly within the print area perimeter P with matching dimensions.

It is understood that this example is meant for demonstration and that a print dieline PD may include any shape and/or any combination of shapes that may properly correspond to a similarly shaped printable area PA on a particular corresponding item of merch.

"Print" generally refers to the reproduction of subject media onto a printable area PA on a particular item of merch. Printing may include an exact reproduction (unaltered) of the subject media onto the merch, a non-exact reproduction (altered in any way) of the subject media onto the merch, and/or any combination of exact and/or non-exact reproductions. For example, printing may include printing the raw subject media file onto a printed area PA, or may include first editing the subject media and then printing the edited subject media onto the printed area PA. Editing may include any type of alteration made to the subject media including, but not limited to, passing the subject media through one or more filters (e.g., color correction, red-eye correction, etc.), making one or more adjustments to the media (e.g., brightness adjustment, contrast adjustment, color level adjustment, sharpness, etc.), augmenting the media (e.g., adding or altering virtual elements within or to the media), changing the media's size (physical size, number of pixels, etc.), changing the media's format (e.g., to black and white, RGB, CMYK, grey scale, etc.), distorting, warping, making abstract, applying other types of editing mechanisms and/or any other types of media editing tools as known in the art, and any combinations thereof. The altering may be performed automatically by the system, the system may provide editing tools for the altering to performed manually, and/or any combinations thereof. Printing may be performed by any type of suitable printing system using any type of suitable printing technologies, including, but not limited to, dye sublimation, heat press transfer, screen printing, direct to garment (DTG), heat transfer vinyl, plastisol transfer, computer aided design (CAD) cut printing, block, roller, embroidering, stitching, sewing, painting, drawing, etching, any other types of image reproduction methods, and any combinations thereof.

It is understood that the types of merch illustrated in FIGS. 1A-1C and 2A-2C (i.e., the t-shirt, the backpack, and the hat) are meant for demonstration and are meant to represent any type of merch whatsoever. It also is understood that the system of the current invention is not limited in any way by the types of merch that it may be used with.

In general, and according to exemplary embodiments hereof, the media capture and merchandise production system 10 captures subject media (e.g., photographs) for the purpose of printing an identified portion of the subject media onto the printable area PA of various types of merchandise (e.g., backpacks, t-shirts, hats, tote bags, etc.). As described herein, the system 10 displays a print dieline PD on the camera display CD while the user is taking a picture so that the user has a clear indication of the portion of the subject media displayed on the camera that will be printed onto a corresponding item of merch.

Figure 4:
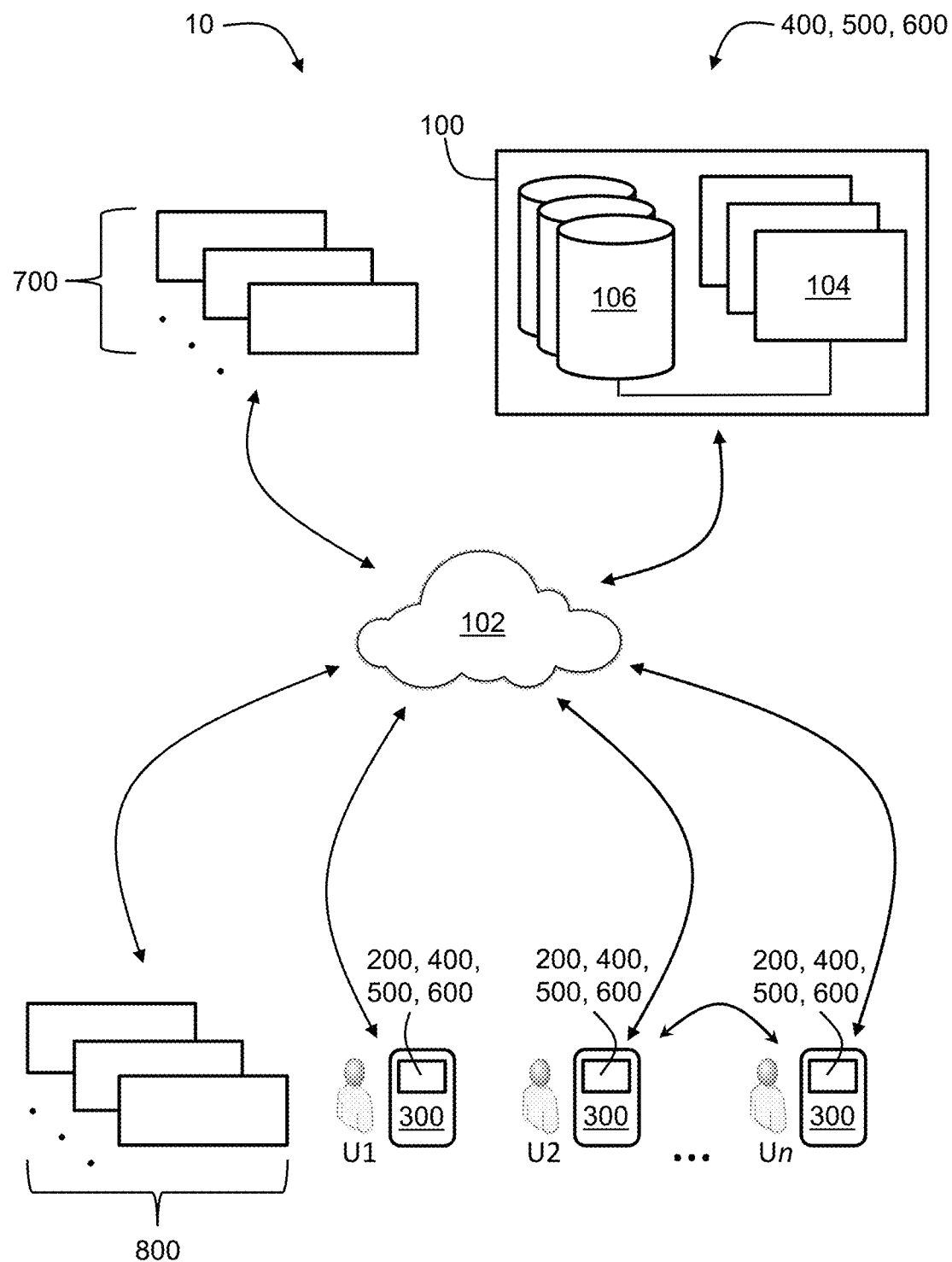
FIG. 4 shows an overview and framework of a media capture and merchandise production system according to exemplary embodiments hereof.

FIG. 4 shows an overview of an exemplary framework for a media capture and reproduction system 10 (also referred to herein as simply the system 10) according to exemplary embodiments hereof. As shown, the media capture and reproduction system 10 may include a backend controller 100 that may interface with users U1, U2, . . . Un of the system 10 (individually and/or collectively Un) via one or more application interfaces 200 (e.g., a mobile application or "app", a browser, website or Internet interface, a social network widget, and/or other types of applications) running on one or more computing devices 300 (e.g., smart phones, tablet computers, laptops, desktop computers, mobile media players, etc.).

Figure 5:
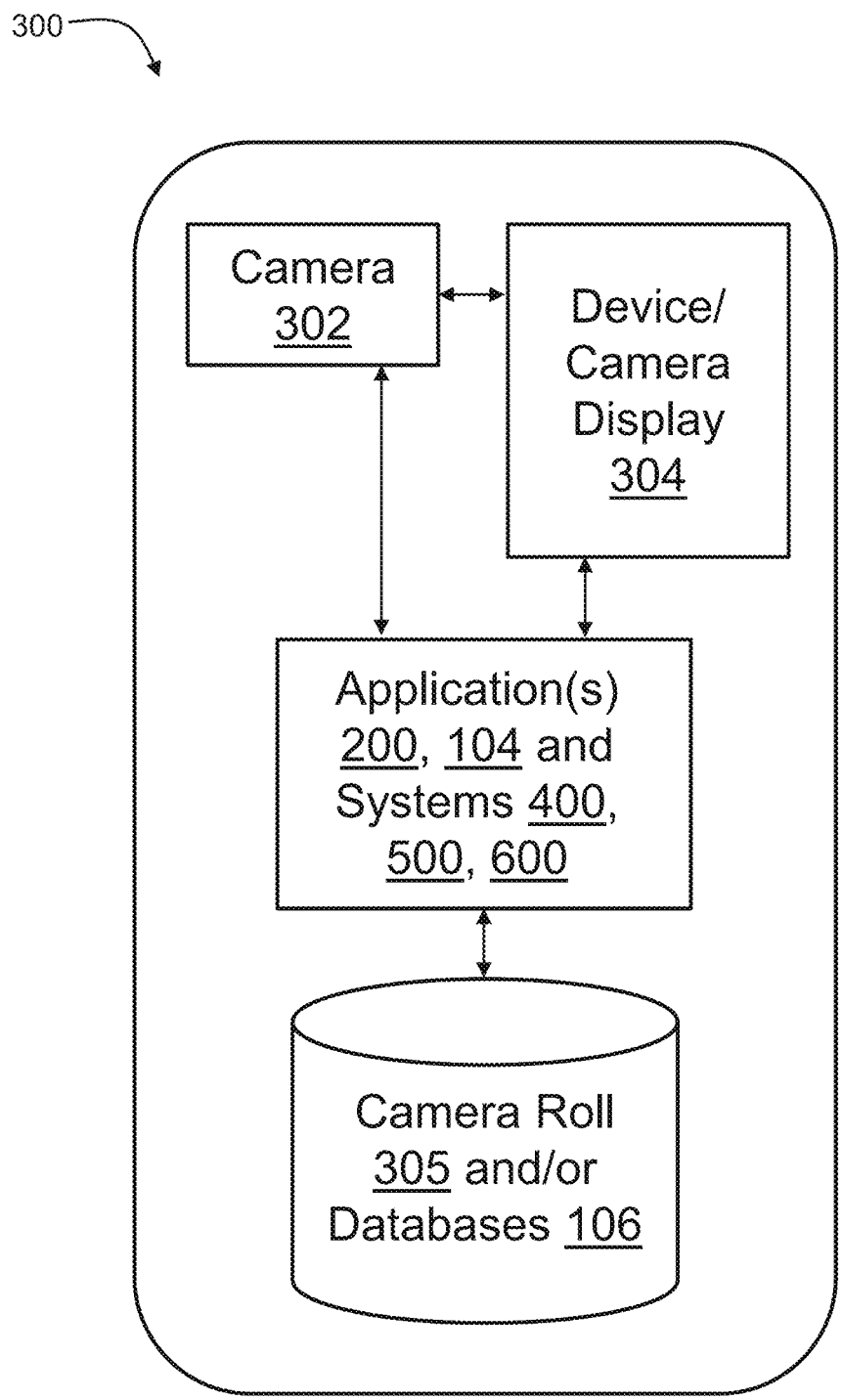
FIG. 5 shows elements of an electronic device according to exemplary embodiments hereof.

FIG. 5 shows a block diagram of an example user device 300 as it may pertain for use with the system 10. As shown, the user device 300 may preferably include a camera 302, a camera display 304 (which also may correspond to the device's 300's display), one or more databases 106 (e.g., databases that store photographs captured by the device's camera 302, also referred to as a camera roll 305), and other elements necessary for the device 300 to perform its functionalities (e.g., a processor, power source, network connection device, etc.). Note that the user device 300 and associated camera display 304 of FIG. 5 may correspond to the smartphone SP and associated camera display CD of FIG. 3, respectively. The user device 300 also stores and runs the mobile application 200 for use with the system 10. It is appreciated that the device 300 and the camera display 304 correspond to the smartphone SP and the camera display CD, respectively, as described in other sections.

The system 10 also may include an image recognition system 400, a media transformation system 500, and a geolocation application 600 (e.g., a global positioning system (GPS) or other types of navigational systems).

The system 10 also may communicate with supplementary systems 700 (e.g., printing facilities, merchandise manufacturing facilities, retail outlets, etc.) and various external systems 800 (e.g., fulfillment systems, logistics management systems, point of sale systems, inventory management systems, accounting systems, external databases, and the like). The system 10 also may include other systems, elements and/or components as required by the system 10 to fulfill its functionalities.

In some embodiments, the backend controller 100, mobile app 200, user device 300, supplemental systems 700 and/or external systems 800 may be connected to and communicate with one another over one or more networks 102, e.g., in any combination, the Internet, LAN, WAN, wireless communication systems, cellular communication systems, telephony and/or other types of communication systems and/or protocols. In other embodiments, the backend controller 100, mobile app 200, user device 300, supplemental systems 700 and/or external systems 800 may communicate directly with one another as necessary, e.g., via Bluetooth, Wi-Fi, or other suitable communication techniques. For example, in some embodiments, the mobile app 200 may communicate directly with a printer to print the selected image onto the merchandise without necessarily communicating to the backend 100.

In some embodiments, the backend controller 100 may include a cloud platform (e.g., one or more backend servers), one or more local controllers, or any combination thereof. In some embodiments, the backend controller 100 includes a cloud platform that interfaces with one or more local controllers. For example, administrators An of the system 10 may interface with the system 10 via a local controller in communication to a cloud platform. It is understood that various functionalities of the system 10 may be performed by the controller 100 as described herein, and that all or some of the same functionalities also may be performed by the mobile application 200. In some embodiments, the controller 100 and the mobile application 200 may work together in sharing and/or otherwise performing the functionalities of the system 10 as described.

Additional details pertaining to the architecture of the system 10 are described in later sections.

In some embodiments, the system 10 may perform at least some of the following acts:

1. Provide a print dieline PD on the display 304 of the device's camera 302 for use while taking a photograph;
2. Enable the user Un to capture a photograph of the desired subject matter displayed on the device's camera display 304;
3. Display the captured photograph on the camera's display 304 (e.g., frozen) overlaid with the print dieline PD;
4. Enable the user Un to adjust the portion, size, orientation, and/or other characteristics of the subject media within the print dieline PD on the camera display 304;
5. Identify the portion of the captured photograph within the print dieline PD;
6. Transform the photograph (specifically the portion of the photograph within the print dieline PD) as necessary for action #7 below;
7. Overlay the (transformed) portion of the photograph within the print dieline PD onto one or more merchandise templates for review (as digital mockups);
8. Display the resulting digital mockups on the camera display 304;
9. Communicate the identified portion of the photograph within the print dieline PD to a production facility (preferably an onsite or nearby mobile facility);
10. Print the identified portion of the photograph within the print dieline PD media onto the printable area PA of a desired merch; and
11. Arrange for the delivery of the resulting customized merch to the user Un (preferably in real-time).

It is understood that the actions described above are meant for demonstration and that the system 10 may perform other actions not described, may not necessarily perform all of the actions described, and/or any combinations thereof. The system 10 also may perform some and/or all of the actions in other order(s).

Exemplary embodiments and details of the system 10 will next be described by way of several detailed examples. The examples provided below are chosen to illustrate various embodiments and implementations of the system 10, and those of ordinary skill in the art will appreciate and understand, upon reading this description, that the examples are not limiting and that the system 10 may be used in different ways. It is also understood that details of different embodiments described in different examples may be combined in any way to form additional embodiments that are all within the scope of the system 10.

Example #1

Figure 6:
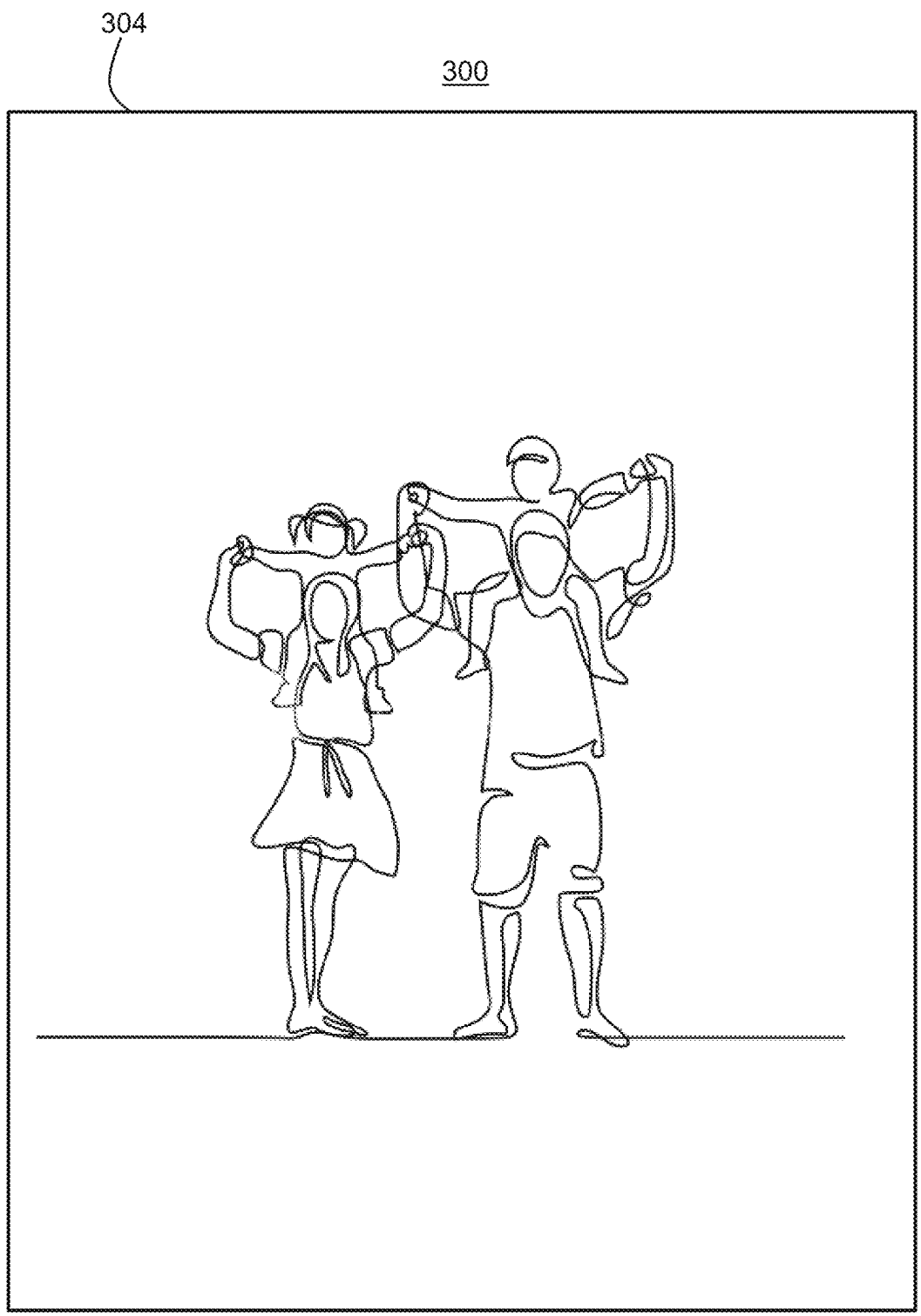
FIG. 6 shows an image displayed on a camera display according to exemplary embodiments hereof.

In a first example, a user Un may utilize the system 10 to take a picture of his/her family standing in front of an attraction at a theme park (e.g., at Disneyland®) for the purpose of printing a desired portion of the picture onto a customized product in real-time (e.g., a backpack, hat, or t-shirt). In this example, the user Un may download the mobile app 200 onto his/her smartphone 300 and utilize the app 200 to take the photograph via the smartphone's built-in camera 302. In some embodiments, the app 200 may be skinned with the theme park's branding, and/or the app 200 may be integrated into an existing mobile app associated with the theme park. FIG. 6 shows an example image of the user's family displayed on the camera display 304 of his/her mobile device 300.

Figure 7:
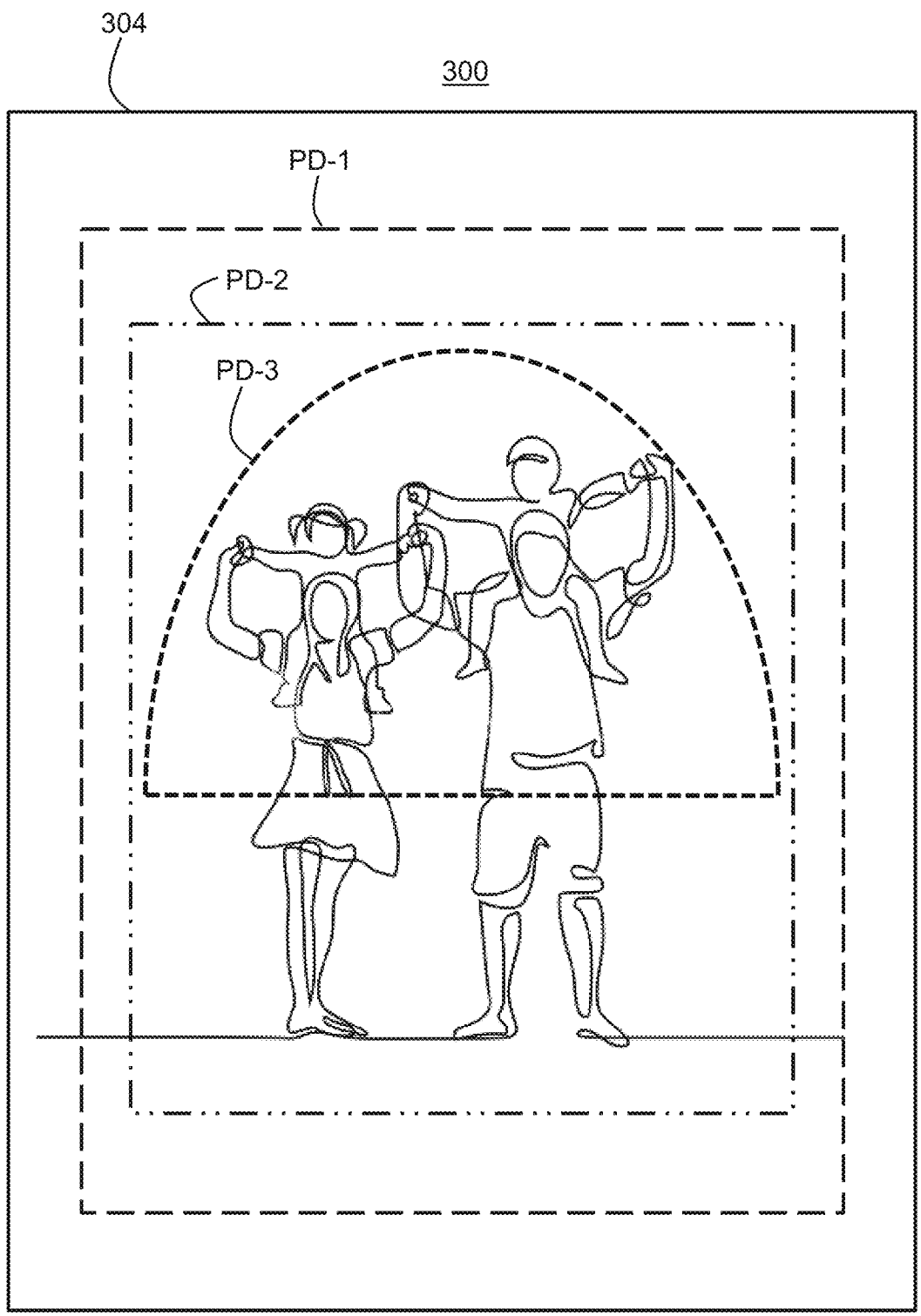
FIG. 7 shows an image and print dielines displayed on a camera display according to exemplary embodiments hereof.

Using the app 200, the user Un may choose the type(s) of merch that he/she may be interested in having custom printed. This may be done by clicking checkboxes, using drop down menus, highlighting images of the desired product types on the app 200 or by other techniques. For the purposes of this example, the user Un may choose a backpack, a t-shirt, and a hat. Once chosen, the system 10 (e.g., the application 200) may overlay print dieline(s) PD for each chosen product onto the camera's viewing display 304 that each represent the portion of the photograph that will be identified (e.g., cropped and/or properly positioned) and subsequently printed onto the corresponding merchandise during production. For example, as shown in FIG. 7, a backpack dieline PD-1 is displayed as a first upright rectangle, a t-shirt dieline PD-2 is displayed as a second upright rectangle, and a hat dieline PD-3 is displayed as an elongated upright semicircle. It is understood that these example print dielines PD are merely examples and that other shaped dielines PD may be used. With the print dielines PD displayed, the user Un may properly place and/or align the important elements of the photograph (e.g., the torsos and faces of the family members) within the dielines PD while taking the picture. In this way, the important elements of the photograph will be properly identified (cropped and/or properly positioned) and printed onto the respective merchandise.

Note that due to the size difference of the various print dielines PD, different dielines PD may contain more (or less) of the overall displayed image than other dielines PD. However, because the dielines PD are preferably centered or otherwise aligned with respect to one another on the display 302, at least a portion of the important elements of the photograph may effectively be placed within each dieline PD.

In some embodiments, each dieline PD may be displayed using a different color, a different line type (solid, dashed, etc.) or by using other types of identifying characteristics.

Note that because the various available merch may be of different sizes and shapes, some merch may require the photograph(s) to be taken in portrait mode while other merch may require the photographs to be taken in landscape mode. In some embodiments, the system 10 may notify the user Un during the picture-taking process which mode to use (e.g., using a dialogue box generated by the app 200). Also, if the user Un is attempting to take a single picture for both portrait and landscape products, and the respective print dielines PD do not fit together on a single photograph, the system 10 may convey this to the user Un and instruct him/her to choose one or the other.

Next, the app 200 next enables the user Un to capture the photograph by using a touchscreen button, a physical button on the device 300, a timer, a remote control, and/or by other techniques.

In some embodiments, the app 200 next displays the captured photograph on the camera display 304 with the respective product dielines PD overlaid the captured image. In this way, the user Un can review the photograph and the subject matter within the photograph with respect to the location, orientation, size, and/or other characteristics of the product dielines PD. If the desired subject matter (e.g., the heads and torsos of the family members) is positioned within the print dielines PD as desired, the user Un may move to the next steps in the process to have the merch printed. However, if the subject matter is not entirely positioned within the product dielines PD as desired (e.g., one of the family member's head is partially outside one or more of the product dielines PD), the app 200 then may enable the user Un to adjust the position, size, orientation and/or other characteristics of the captured image with respect to the product dielines PD. For example, the app 200 may enable the user Un to use a single-finger and/or a two-finger touch technique on the camera display 304 (touchscreen) to make any necessary adjustments to the image. Other adjustment techniques and/or tools also may be provided. In other embodiments, the app 200 may enable the user to similarly adjust the product dieline PD instead of, and/or in addition to, the captured image using a single-finger and/or a two-finger touch technique applied to the dielines PD.

Figure 8:
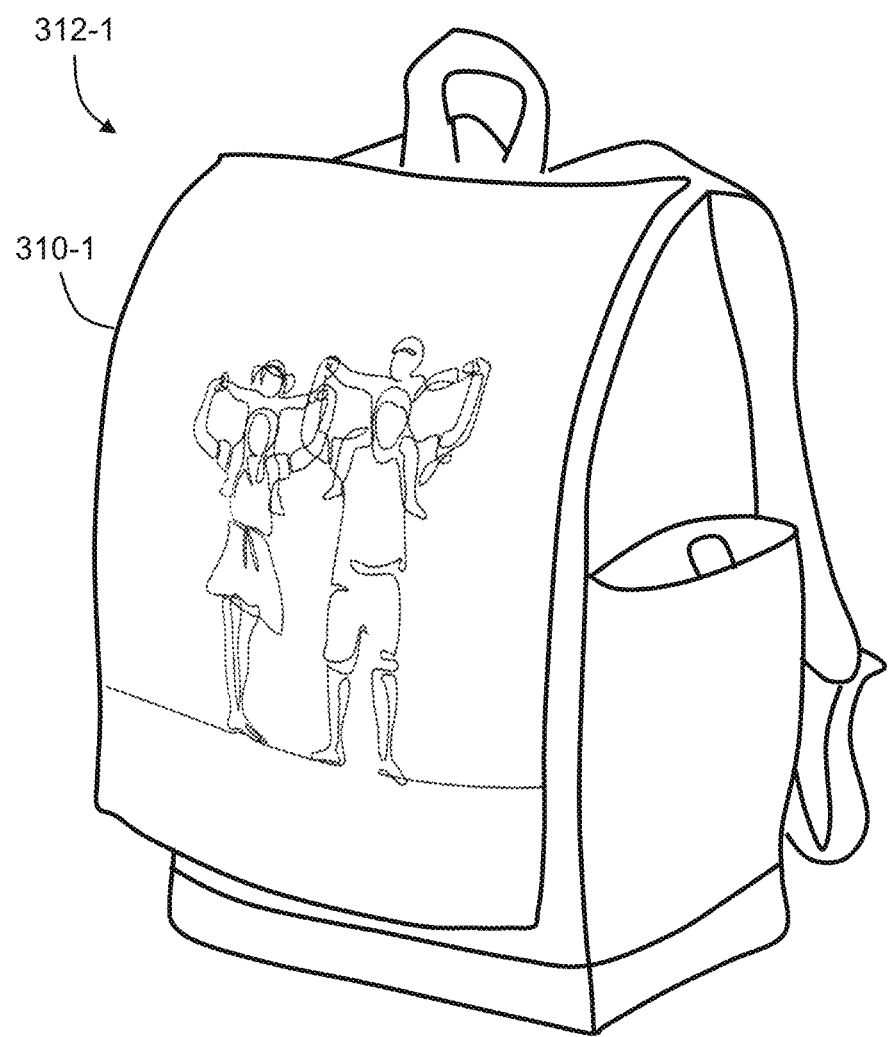
FIGS. 8-10 show aspects of articles of merchandise in accordance with exemplary embodiments hereof.
Figure 9:
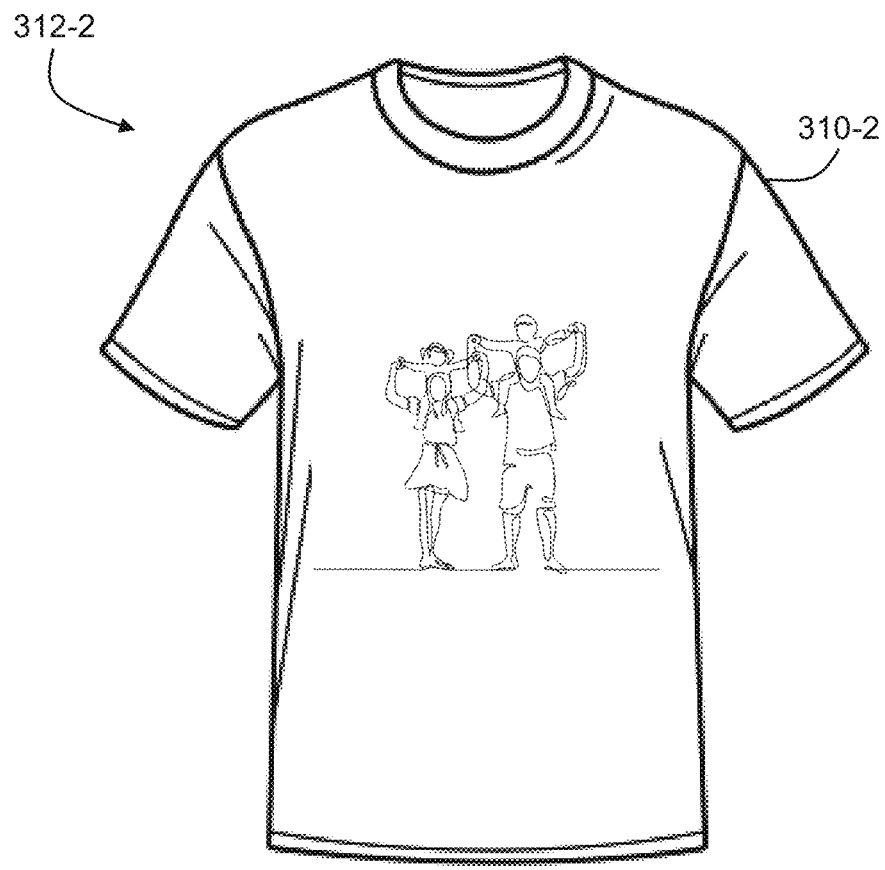
Figure 10:
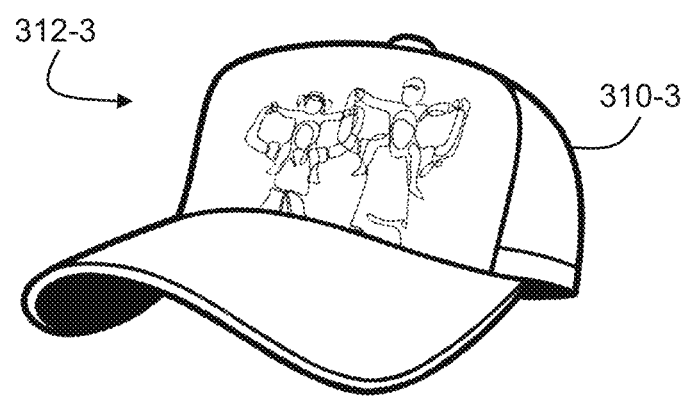

In some embodiments as shown in FIGS. 8-10, once a picture has been taken, reviewed, and/or adjusted, the system 10 (e.g., the media transformation system 500) may crop and/or position the picture per each print dieline PD (e.g., print dielines PD-1, PD-2, PD-3 as shown in FIG. 7), superimpose the images onto each respective merchandise template 310 (also designated to herein as MT) and display the resulting digital mock-ups 312 on the smartphone's display 304 for review. In other embodiments, the user Un may choose which merchandise template(s) 310 he/she may wish to review.

For example, as shown in FIG. 8, the system 10 (e.g., the media transformation system 500) may crop and/or position the picture per the backpack dieline PD-1, warp the image to orient it at the same perspective as the backpack template 310-1 (e.g., three-quarter angle), overlay the warped image onto the backpack template 310-1 (within the backpack's printable area PA) and display the resulting digital mockup 312-1 on the display 304 of the user's device 300. In another example as shown in FIG. 9, the system 10 may crop and/or position the picture per the t-shirt dieline PD-2, overlay the image onto the t-shirt template 310-2 (within the t-shirt's printable area PA), and display the resulting digital mockup 312-2 on the display 304 of the user's device 300. In another example as shown in FIG. 10, the system 10 may crop and/or position the picture per the hat dieline PD-3, warp the image to orient it at the same perspective as the hat template 310-3 overlay the warped image onto the hat template 310-3 (within the hat's printable area PA), and display the resulting digital mockup 312-3 on the display 304 of the user's device 300.

In this way, the user Un may immediately see firsthand how the picture may look if the photograph were to be printed onto each of the respective types of merchandise.

In some embodiments, the system 10 provides tools for the user Un to adjust the position, size, orientation and/or other characteristics of the captured image with respect to the digital mockup 312 (e.g., by using single-finger and/or a two-finger touch techniques on the camera display 304 (touchscreen) to make any necessary adjustments to the image within the merchandise template 310).

In some embodiments, the user Un may utilize the system 10 to take video media and then extract one or more still images from the video to be used as subject media by the system 10 as described herein.

In some embodiments, the system 10 may provide editing tools (e.g., via the mobile app 200) that the user Un may utilize to overlay text and/or other imagery onto the photograph (e.g., within the merch printable areas PA), and/or to otherwise manipulate the photograph and its overall design as desired. For example, the tools may enable the user Un to resize or reposition the image on the template 310, add the names of the children and/or a caption such as "Vacation 2023!", add a background, a border, a frame, other graphics (emojis, logos, etc.) and/or other elements. In addition, the app 200 may provide tools for color correction, red-eye correction, brightness adjustment, contrast adjustment, color level adjustment, sharpness, digital/analog filtering, format change (e.g., to black and white), distortion, and/or any other types of media editing tools. Because the editing tools are provided by a mobile application 200 running on a user device 300, the number and complexity of the tools may be superior to web-based editing systems. In some embodiments, the system 10 may perform some or all of these types of manipulations automatically (e.g., automatic color correction, brightness adjustment, red-eye correction, etc.).

In some embodiments, the system's editing tools may be implemented onto a merchandise template 310 (e.g., onto the images of FIGS. 8-10) and/or onto a print dieline PD (e.g., onto the image of FIG. 7). In some embodiments, once the user Un has performed his/her preferred edits, the system 10 may save the edits such that they may be easily replicated onto additional merch templates 310 or dielines PD. In this way, the user Un may not be required to manually edit each and every merch template 310 or dieline PD one at a time.

In some embodiments, the system 10 may provide design templates that the user Un may choose from to add additional elements to the photograph. For example, a design template may include ready-made ornamental frames, borders, backgrounds, themes, emojis, etc. that may enhance the designs. In some embodiments, the design template also may include the location, date, user's name (e.g., taken from the user's profile information), captions such as "Disneyland Vacation 2023!", and other elements. In some embodiments, a design template may include and/or correspond to a particular print dieline PD such that images shown within the dieline PD may properly fit within the design template.

In some embodiments, the system 10 also may place the logo of the theme park onto the image for branding purposes (e.g., in a lower corner of the design). In other embodiments, the theme park branding may be incorporated into the design templates. It is understood that any type of branding may be added by the system 10 depending on the requirements of the theme park (and/or other sponsoring entity).

Once the user Un has finished manipulating the merch design to his/her satisfaction, he/she may place an order to have the customized merchandise produced. For example, in some embodiments, this may simply involve the user Un pressing a button on the display 302 of his/her smartphone 300 (e.g., an "order now" button on the app 200). In some embodiments, this may require the user Un to purchase the merchandise, but this may not be required in all instances.

Once the user Un has placed the order, the system 10 may generate high-resolution media assets for the order (e.g., the high-resolution photograph including edits, dieline crops, dieline positions, merchandise templates, etc.) and communicate the assets (and the order information) to a production facility 700 to be produced. In some embodiments, the app 200 may communicate the assets to the backend platform 100 wherein the assets may be saved in one or more databases 106, and the backend platform 100 may then communicate the assets to the appropriate production facility 700 to be produced.

In some embodiments, the production facility 700 may include a mobile facility (e.g., a van or kiosk equipped with the necessary production equipment) located close to the user Un (e.g., onsite or in close proximity to the theme park) so that the merchandise may be produced in real-time and provided to the user Un shortly thereafter. In this case, the system 10 may notify the user Un of the pickup location (e.g., including an interactive map showing the user's GPS location, the pickup location, and instructions on how to get there) and a time that the merch may be available.

In other embodiments, the production facility 700 may be located offsite such that the merchandise may be produced and shipped to the user Un when completed.

Figure 11:
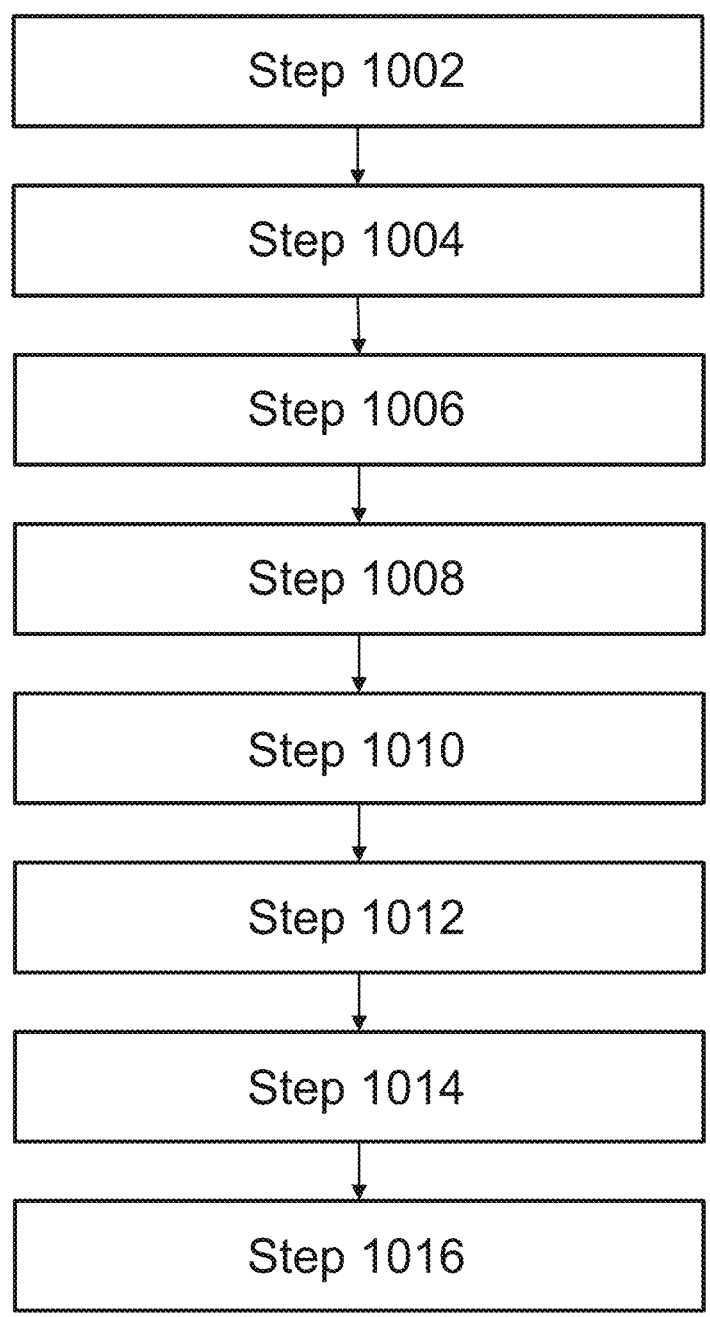
FIG. 11 shows a workflow taken by a media capture and merchandise production system according to exemplary embodiments hereof.

Given the above, a summary of the actions 1000 taken to create custom merchandise as described thus far using the system 10 and as shown in FIG. 11 may include:

1002: User Un opens app 200 on device 300 and chooses product(s) of interest;
1004: The system 10 launches the camera 302 and displays the print dielines PD for the merchandise chosen onto the camera's display 304;
1006: User Un takes picture while positioning the important elements of the picture within the dielines PD;
1008: The system 10 displays the captured photograph including the dielines PD and the user Un and/or the system 10 edits the image (adds captions, etc.);
1010: System 10 transforms the media and creates a digital mockup(s) for review and/or edit further;
1012: User Un places order;
1014: System 10 transfers media assets to production facility (e.g., to a printer located onsite);
1016: System 10 produces the order and delivers it to the user Un.

It is understood that the actions described above are meant for demonstration and that other actions also may be taken. It is also understood that not all actions must be taken, and that the actions may be taken in different order(s).

Figure 12:
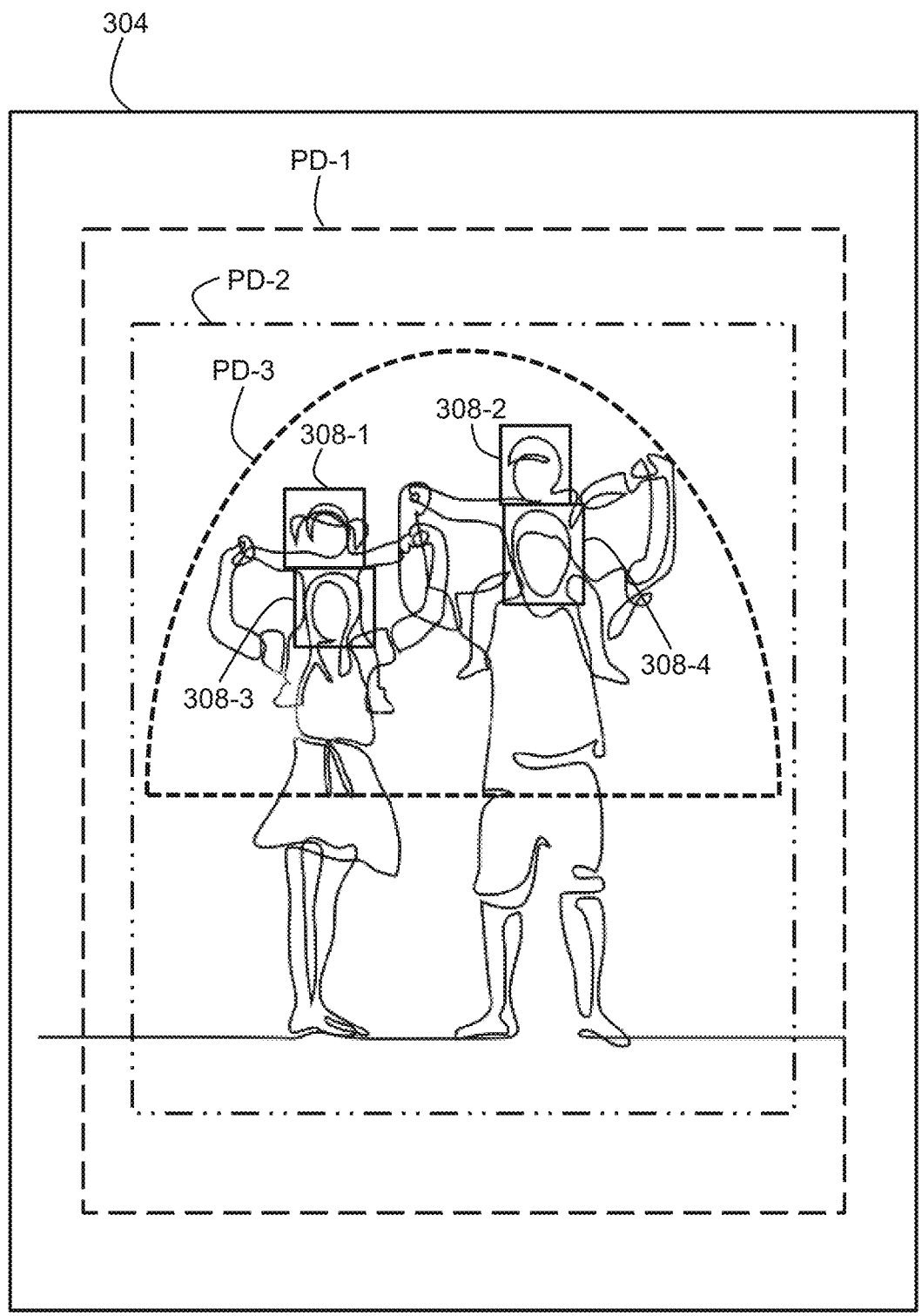
FIG. 12 shows an image and print dielines displayed on a camera display with image recognition according to exemplary embodiments hereof.

Expanding on this example as shown in FIG. 12, during the picture taking process, the system 10 may use its image recognition system 400 (i.e., facial recognition) to recognize the faces 308-1, 308-2, 308-3, 308-4 and/or the corresponding identities of the family members on the display 304. In some embodiments, the identities of the persons in the photograph may then be stored by the system 10 and used to embellish a design template for the image. For example, the system 10 may overlay the first names of each person onto the image (e.g., above their heads) in an attractive font. In some embodiments, the system 400 may recognize the family members' faces, celebrity faces, any other faces, and any combination thereof.

In some embodiments, the system 10 may use the recognized face information to confirm that the faces 308 are positioned within each print dieline PD. If the recognized faces 308 are determined to all be within the print dielines PD, the application 200 may alert the user Un of this fact and enable the camera 302 to take the picture. However, if the system 10 determines that one or more of the recognized faces 308 are outside the perimeter of one or more print dielines PD, the application 200 may alert the user Un and optionally temporarily disable the camera 302 (optional). For example, if a recognized face 308 is determined to be outside a particular print dieline PD, the particular dieline PD may flash red until the camera 302 is repositioned such that the faces 308 are all within the dieline PD. Once the faces 308 are all within all of the dielines PD, the dielines PD may flash green and the camera 302 may be enabled to take the picture. It is understood that this example is meant for demonstration, and that other methods may be used to alert the user Un that one or more faces 308 may be outside the displayed print dielines PD. For example, the mobile app 200 may display a textual warning (e.g., a dialogue box) identifying the dieline(s) PD that may have problems while presenting the option to reposition the camera 302 or to take the photograph regardless of the issue. Other types of alerts also may be used. It is also understood that the user Un may override the warning(s) at any time.

In some embodiments, the application 200 may resize and/or reposition a particular print dieline PD to optimize the important elements into and within the dieline PD. For example, the application 200 may enlarge a dieline PD (preferably while keeping its proportions) so that it includes all of the recognized faces within the photograph. In another example, the application may shift a dieline PD to the left (or anywhere else on the display 304) so that the important elements are within the dieline PD. The application 200 also may rotate a dieline PD as necessary to achieve this result. It is understood that these examples are meant for demonstration and that the system 10 and/or application 200 may modify or otherwise manipulate one or more dielines PD to optimize the inclusion of the important elements into the dielines PD.

In addition, while the description above references the system's use of its image recognition system 400 to recognize faces within the photograph, the image recognition system 400 may recognize other elements within the photograph that are also of importance. In some embodiments, the system 400 may recognize physical attractions, signs, man-made landmarks, natural landmarks, other types of physical forms and any combination thereof. In one example, the family may be standing in front of a sign (e.g., the Disneyland® sign), an attraction (e.g., the Disneyland® castle), or with a theme park character in an outfit that is not recognizable as a human face (e.g., Mickey Mouse®) that also are important elements of the photograph. In this case, the image recognition system 400 may recognize these additional important elements and ensure that the elements are within the dielines PD for the proper cropping and/or positioning of the images during production. In some embodiments, the image recognition system 400 may be pre-programmed to recognize these additional types of elements (e.g., with a library of popular elements), may learn to recognize these additional elements (using machine learning as described below), may be instructed by the user Un to recognize the elements (e.g., through the app 200), or by other means. In this way, the system 10 may ensure that not only are important human features included within the dielines PD, but that important non-human elements also are recognized and included. It is understood that any type of form may be recognized (e.g., humans, pets, structures, landscapes, etc.) and that the scope of the system 10 is not limited in any way by the images that the system 10 may recognize.

Figure 13:
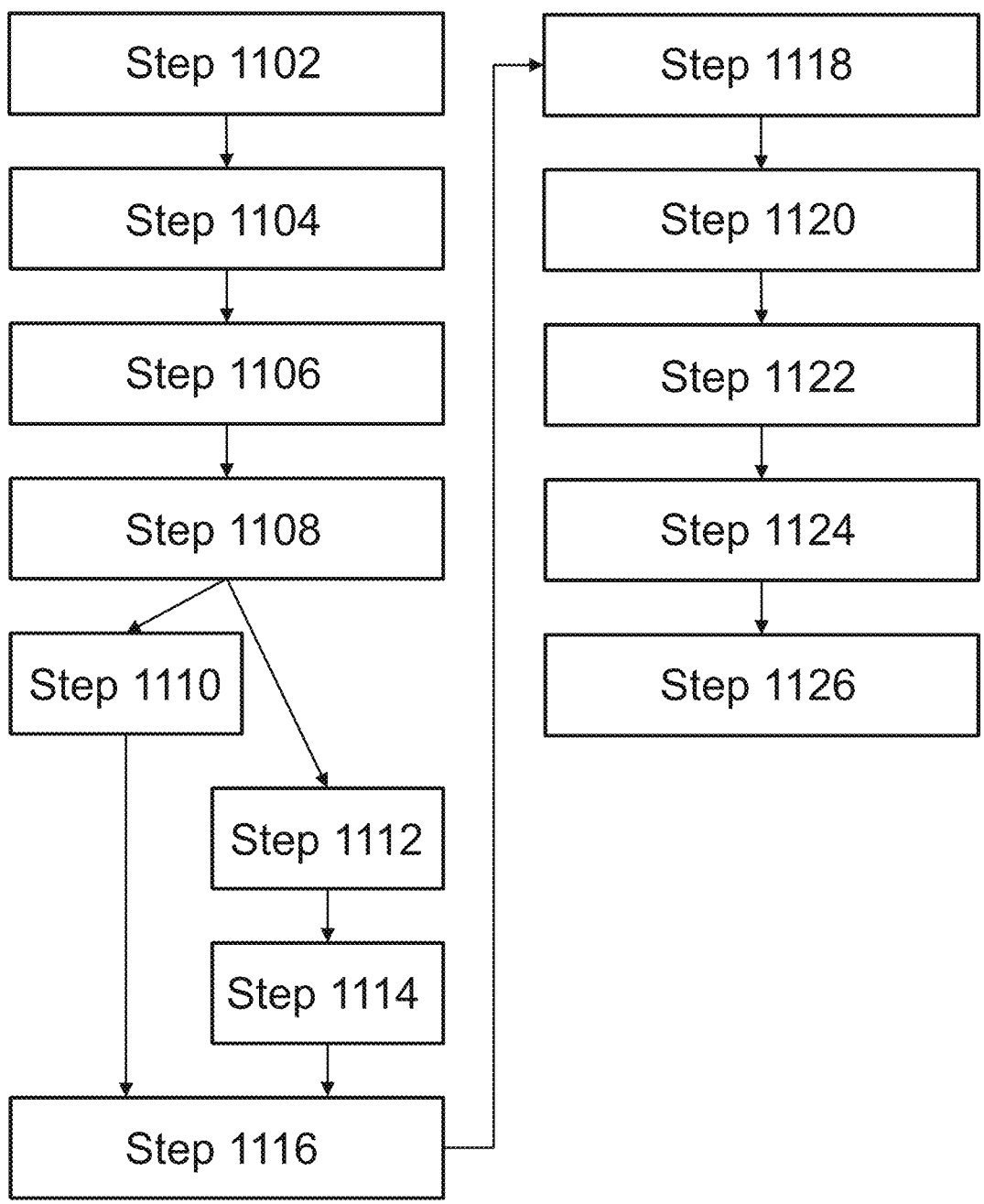
FIG. 13 shows a workflow taken by a media capture and merchandise production system according to exemplary embodiments hereof.

Given the above, a summary of the actions 1100 taken by the image recognition system 400 (and the overall system 10 and in combination with user actions) to identify important elements within each photograph (e.g., faces, identities, physical attractions, celebrities, signs, landmarks, etc.), and to utilize this information to embellish and/or optimize the resulting media assets as shown in FIG. 13 may include:

- 1102: User Un opens app 200 on device 300 and chooses product(s) of interest;
- 1104: The system 10 launches the camera 302 and displays the print dielines PD for the merchandise chosen onto the camera's display 304;
- 1106: The user Un positions the important elements of the picture within the dielines PD;
- 1108: The image recognition system 400 recognizes the faces of each person of importance and/or the physical attraction(s) in the picture and determines whether or not each recognized face and/or physical attraction(s) is properly positioned within the print dielines PD;
- 1110: If it is determined that each face and/or physical attraction is properly positioned, the system 10 facilitates the taking of the picture;
- 1112: If, however, it is determined that one or more faces and/or physical attractions are not properly positioned within the dielines PD, the system 10 notifies the user Un of this fact so that he/she may make the necessary corrections;
- 1114: If desired, the system 10 adjusts the dielines PD automatically (resize, reposition, rotate, etc.) so that the recognized faces and/or physical attractions are properly positioned within the dielines PD;
- 1116: User Un takes picture while centering the important elements of the picture within the dielines PD;
- 1118: User Un and/or the system 10 edits the image (adds captions, names of the recognized faces, etc.);
- 1120: System 10 transforms the media and creates a digital mockup(s) for review;
- 1122: User Un places order;
- 1124: System 10 transfers media assets to production facility (e.g., to a printer located onsite);
- 1126: System 10 produces the order and delivers it to the user Un.

It is understood that the actions described above are meant for demonstration and that other actions also may be taken. It is also understood that not all actions must be taken, and that the actions may be taken in different order(s).

In some embodiments, the system 10 may utilize its facial (and image) recognition system 400 to overlay digital effects onto the faces of different people in the photograph. For example, the user Un may choose to place digitally overlaid mustaches onto one or more persons in the picture, digital sunglasses, emojis, hearts signifying affection between the persons in the picture, and other types of digital effects. Other virtual elements also may be added to the pictures, such as, without limitation, virtual characters (e.g., superheroes) standing next to the other people in the photograph, virtual backgrounds, other virtual elements, and any combinations thereof. In some embodiments, the added virtual elements may be displayed on the camera display 304 such that the user Un taking the photograph can adjust placement of the other people in the photograph to stand in the proper locations and/or orientations with respect to the virtual elements.

Figure 14:
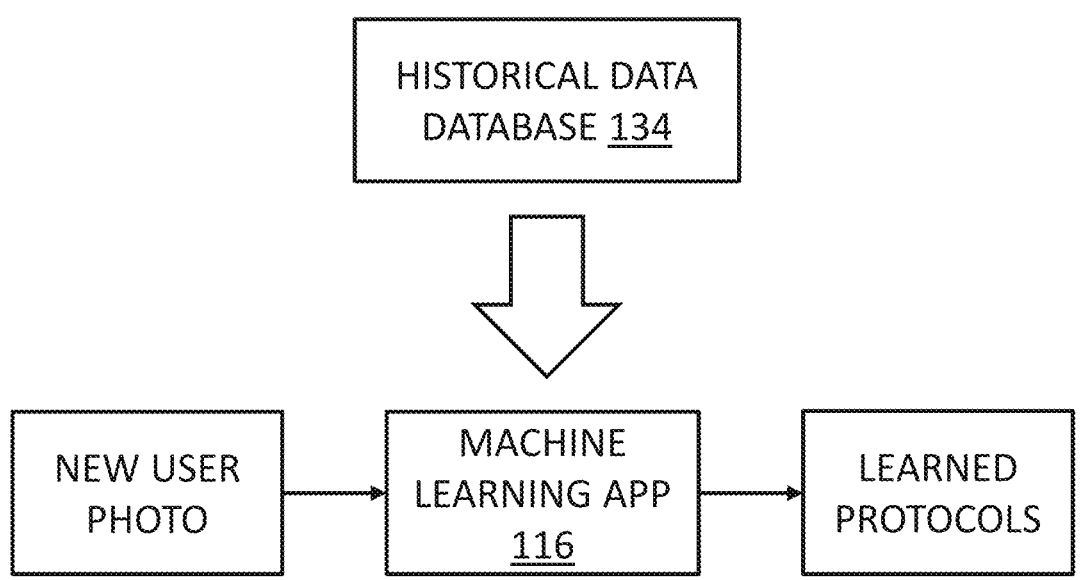
FIG. 14 shows aspects of a machine learning application according to exemplary embodiments hereof.

After creating one or more digital mockups 312 as described above, the user Un may decide to choose a new type of merchandise that he/she may wish to consider (e.g., a tote bag), and the system 10 may overlay the image onto the new template 310 to create the new mockup 312. In this case, if the new merchandise type was not selected prior to the taking of the picture, and as such, its print dieline PD was not displayed on the camera's display 304 during the process, the system 10 may utilize artificial intelligence (AI) to place the image onto the new template 310 in the proper position. In some embodiments as shown in FIG. 14, the system 10 may implement machine learning (e.g., using the machine learning application 116 as described below) including deep neural networks (DNNs), artificial neural networks (ANNs), etc. to learn (e.g., using feature learning, representation learning, etc.) the user's preferences implemented prior on the original dielines PD. This may include learning how the user Un positioned the picture elements within the print dielines PD during the taking of the photograph(s), and/or any modifications that the user Un may have made during postproduction. In this way, the system 10 may place the image onto the new merch template 310 and implement media transformations in a way that the user Un desires and correlates with the learned user layout preferences.

In some embodiments of this, the system 10 may store historical data regarding the user's prior selected merchandise, photographs, dieline placements, image edits and/or manipulations, and/or other information regarding the user Un, into the historical data database(s) 134 for use with the machine learning application 116. As shown in FIG. 14, the system 10 may learn the merchandise and layout preferences of the user Un (via the machine learning application 116) and output a series of learned protocols that represent the user's preferences. The system 10 may then use the learned protocols to recommend future products, to determine the preferred image layouts, manipulations, and transformations for new photographs, and to generally streamline the entire process from the capturing of the image(s) to the ordering of the associated merchandise.

For example, the system 10 may use its image recognition system 400 to recognize the elements within the user's stored photographs, and its machine learning application 116 to learn the alignment(s) and associations between the elements and the print dielines PD. That is, the system 10 may determine what elements of the photograph were included within the original dielines PD, the respective sizing of the elements, the respective positioning of the elements, the editing and/or manipulations of the photographs, and any other characteristics that may determine the overall design of the image within the print dielines PD. Then, by using these learned preferences, the system 10 may transform the image onto the new print dieline PD to include the same elements at correlating sizes, placements, edits, etc. Once this is completed, the system 10 may crop and/or position the picture accordingly and overlay it onto the new merch template 310 to create the new digital mockup 312 for review.

Note that the system 10 may provide this functionality for any picture taken at any time (including pictures taken without the app 200 and saved to the user's device camera roll 305 or otherwise). For example, a user Un may discover an old photograph in his/her camera roll 305 that he/she may wish to use with the system 10. As such, the user Un may use the app 200 to choose the picture, and the system 10 may transform the picture onto the respective print dielines PD per the learned preferences of the user Un. Alternatively, the system 10 may enable the user Un to perform the transformations manually (e.g., using single-finger and/or two-finger screen grabbing techniques).

In addition, the system 10 may use this functionality to fix poorly placed images (e.g., photographs that include important elements outside the dielines PD) and/or to optimize the image placement given bleed lines, borders, etc. during production. In some embodiments, the system 10 may recognize images that include potentially important elements outside the print dielines PD and may ask the user Un if he/she would like for the system 10 to make any suggested adjustments. If more than one dieline PD is displayed, the system 10 may apply a best fit for the elements to fit within each dieline PD. In some cases, the system 10 may provide several options (different types of manipulations) for the user Un to choose from. The system 10 also may provide the user Un the ability to turn on/off this functionality, and/or to undo actions taken by this functionality at any time.

In some embodiments, the system 10 may learn and store information regarding the products that the user Un seems to be interested in, as well as the manipulations that the user Un may have made to any associated photographs. Using this learned information, the system 10 may automatically load the corresponding print dielines PD and edits onto the camera's display 304 for the user Un to use while taking additional photographs throughout the day. In this way, the user Un may take new pictures and order new merchandise without having to repeat the work already done.

In some embodiments, the system 10 may store the media assets for each design that the user Un may have created into a library of the user's designs accessible through the app 200. For example, the system 10 may store the media assets of each user Un into a database 106 such as the historical data database 132 as described in other sections. In this way, he/she may revisit the designs at any time to order one or more of the items and have them produced.

In some embodiments, the system 10 may use the media assets stored in its historical database 132 to create new types of merch using the assets and present them to the user Un for consideration. For example, the system 10 may use machine learning to determine the user's favorite photographs and place them onto additional merch templates (e.g., newly released merch) not viewed prior.

In other embodiments, the system 10 may determine a set of favorite images (e.g., 6-24 images) and create a picture book, a collage, and/or other type(s) of products for the user Un. In some embodiments, the system 10 may provide the tools for the user Un to move any of the images to new locations on the new product and/or make any types of adjustments desired. In some embodiments, the system 10 may provide a tool to allow the user Un to reshuffle the images so that they appear in different positions. In some embodiments, the system 10 may enable the user Un to identify his/her desired photographs, either stored in a database 106 and/or on the user's device 300 (e.g., in the device's camera roll 305) for such a product. In this case, the system 10 may display the images and allow the user Un to choose the images that he/she would like to use. If the user Un does not choose enough images as required by the product, the system 10 may determine additional favorite images to use as required.

In some embodiments, the system 10 may crop and/or properly position the main elements of the favorite photographs to match how the elements were positioned during the taking of the photographs prior to placing them onto the new products, picture books, collages, or other products. In this way, the photographs may be cropped and/or properly positioned on the new products as the user Un and/or the system 10 did prior. In other embodiments, the system 10 may crop and/or place the photographs in different ways not used prior.

While this example has described details of the system 10 for use at a theme park or similar, it is understood that these details also may pertain to photographs taken at other events or locations, such as, without limitation, conferences, comic-cons, sporting events, shows, at a party (e.g., costume party), during a street fair, at a live music festival, on vacation anywhere, on the beach, at a resort, on a cruise, at a ski resort, camping, hiking, running a marathon, at a walkathon, at a charity walk, at a peaceful protest, at a spa, at any other location and any combinations thereof. It also is understood that the system 10 may be used to take any type of photograph of any type of object, theme or setting, such as, without limitation, people, places, things, selfies, landscapes, landmarks, nature, skylines, animals, plants, celebrities, sports figures, characters, artwork, any other types of subject matter and any combination thereof. It also is understood that the scope of the system 10 is not limited in any way by the subject matter of the photographs and/or by the location at which it may be used.

In some embodiments, the system 10 may utilize its geolocation application 600 to locate the user's physical location, and to suggest nearby landmarks or other attractions that the user Un may be interested in for taking photographs. In some embodiments, the geolocation system 600 may provide an interactive map that may guide the user Un to the locations while providing information regarding the locations, pertinent schedules, and other information. For example, the geolocation system 600 may provide an interactive map of the theme park along with landmarks and schedules of when the theme park characters may be located at particular locations within the park for photo opportunities.

In some embodiments, the system 10 may determine the location of the user Un and the landmark included in the photograph (using its geolocation application 600), and may add captions or other elements to the image (e.g., using a design template) pertaining to the landmark, such as (without limitation), the name of the landmark, the time and date that that user Un is at the landmark, graphics resembling the landmark, other elements relating to the landmark and any combination thereof.

The system 600 also may show the user Un where he/she may go to pick up his/her ordered merch and when the merch may be available.

Example #2

In a second example, a company may wish to provide customized promotional merchandise to the attendees at a fundraiser event and may utilize the system 10 to do so. In this example, the event may include the attendance of several celebrities that other attendees may wish to be photographed with, and the system 10 may facilitate transforming the resulting photographs onto custom printed merchandise.

In some embodiments, the company may set up a promotion (also referred to as a campaign) with the system 10 that includes providing a company branded version of the mobile app 200 to the users Un (the attendees). For example, the mobile app 200 may be skinned to include the company's branding (e.g., the company's logo, brand colors, brand fonts, etc.) so that use of the app 200 contributes to the brand's awareness, goodwill, positive perception, and market value.

For each promotion, the system 10 may provide unique credentials (username and password, access code, etc.) to each user Un to be used to gain access to the app's functionalities. In this way, each attendee Un may use the app 200 to take pictures at the event using their own camera 302 (while utilizing the functionalities of the system 10 as described above), and the system 10 may transform the pictures into customized merchandise. For example, the company may arrange for 500 attendees Un to receive the mobile app 200 and its associated credentials, such that 500 units of merchandise may ultimately be created during the event by using the system 10. The sponsor also may determine which types of merch that the system 10 may offer.

In some embodiments, the system 10 may place branding elements of the sponsoring company (or the charity benefitting from the fundraiser, etc.) onto the photograph during production for additional branding. For example, the system 10 may place the sponsor's logo in a lower corner of the printed merch, the name and date of the event along the upper or lower border, and/or other types of branding elements in other locations on the merchandise.

Once an attendee Un has taken a picture with the app 200 and placed an order, the system 10 may communicate the media assets (e.g., photograph, edits, die-lines, merchandise templates, etc.) to a production facility 700 to be produced. In a preferred implementation of this embodiment, the production facility 700 may include a mobile facility 700 (e.g., a van equipped with the necessary production equipment) located at the event so that the merchandise may be produced in real-time and provided to the attendees Un during the event. In this way, attendees may receive their merchandise in real-time, and others who have not yet done so, may see the merch and become excited to create their own.

In addition, once an attendee Un has received his/her custom merch, he/she may order additional merch through the system 10 (e.g., at a cost).

Additional merch may be produced using the system 10 to be autographed by the celebrities and auctioned off for additional fundraising opportunities.

In some embodiments, the system 10 may run a plurality of different promotions simultaneously for different events at different locations, with each promotion utilizing unique credentials, different app branding, different merchandise, etc. In this case, the system 10 may identify which promotion a particular user Un may be affiliated with, e.g., by determining the location of the particular user Un, by linking the user's login credentials to a promotion, by geofencing, etc., and thereby provide a corresponding application 200 to the user Un with the proper branding, merchandise listings, sponsorship graphics, etc. In this example, the app 200 also may guide the user Un to the proper location associated with the particular event/promotion to pick up the printed merchandise when completed (e.g., via an interactive GPS map).

In some embodiments, after the event has concluded and the associated custom merchandise has been ordered, produced, and delivered to each user Un, the system 10 may update the mobile app 200 on each user's device 300 to replace the company branding with the system 10 branding. In this way, the user Un may continue to utilize the app 200 for future purchases.

Example #3

In a third example, the mobile production van 700 may park onsite at an event such as a charity walk, celebrity event, sporting event, peaceful protest, street fair, music festival, street party, vacation spot, marathon, and other types of locations in order to produce custom merchandise in real-time for the attendees Un. In this example, attendees Un may use the app 200 with their own camera 302 on their own device 300 to take photographs at the location, and then design and order custom merchandise through the app 200 as described above. In some embodiments, this may include a retail sales model so that customers Un pay for the products.

In some embodiments, the mobile production van 700 may promote its services onsite through the use of handouts (e.g., with QR codes), fliers, promotions, contests, giveaways, etc., to create awareness of the mobile app 200 and of the system's onsite real-time production capabilities. In this way, potential customers Un may download the app 200 and use it throughout the day to take photographs and to order merchandise.

In some embodiments, the system's geolocation application 600 may locate the user's physical location and display a map indicating where the van 700 may be located relative to their location for order pickup. The application 200 also may indicate the time that the order(s) may be ready.

Example #4

In a fourth example, the system 10 may be used to acquire screenshots from gaming consoles, PC games, mobile games, and the like, and to transform the screenshots onto custom printed merchandise. In this example, a game may include a player's avatar participating in various activities in graphically enhanced environments. For example, a player's avatar may be a fantastical warrior, a supernatural being, a superhero, a manga or anime character, and/or other type of character, and the system 10 may capture real-time action shots of the avatar during gameplay. The games may include any types of games including single-player, multiplayer, 2-dimensional, 3-dimensional, virtual reality, augmented reality, action games, action-adventure games, adventure games, role-playing games, simulation games, strategy games, sports games, puzzle games, idle games, educational games, adult games, other types of games and any combination thereof.

In some embodiments, the system 10 may interface with a game console, PC, mobile device, etc. to acquire the screenshots (automatically, triggered by the player Un, and/or in other ways) and the resulting image may be placed into the camera roll of the user's device 300, and/or onto the display of the device 300 including an associated print dieline PD, and/or onto a merchandise template 310 within the app 200. From there, the user Un and/or the system 10 may manipulate and/or edit the image resulting in digital mock-ups of the custom printed merch for review. The user Un may then order merch that includes the image, and the system 10 may produce the merch and provide the custom merch to the user Un as described above.

In some embodiments, the system 10 may place branding elements of the game onto the print design(s), e.g., the game logo may be placed in a lower or upper corner on the print. In other embodiments, the system 10 may place team or club branding (e.g., a gaming team and/or club logo that the gamer Un may be associated with) onto the print design. In some embodiments, the branding elements may be provided by the game provider, by the user Un, or by other means.

The system 10 may interface with any external sources or systems such as, without limitation, gaming systems, entertainment systems, streaming sources, Internet websites, and other sources, via network protocols (Internet, LAN, WAN, etc.), wireless communications, cellular communications, telephony, hard wiring, and/or any other communication technologies. The system 10 may import the media and the imported media may be preferably placed into a device's camera roll 305, onto a display including an associated dieline PD and/or a template 310 to be subsequently accessed by the system 10.

It also is understood that the system 10 may import any pre-existing media from any preexisting device's camera roll 305, and that the system 10 may subsequently place the media onto merchandise templates, manipulate the media and/or subsequently print the media onto selected merchandise. This may include any type of media including photographs, graphics, stills taken from any videos, any other type of media and any combination thereof.

Print Dielines PD

As described in other sections and as shown in FIGS. 3 and 7, a print dieline PD includes a visual representation, e.g., a dashed outline, that indicates the portion of the subject media displayed on the camera display 304 that will be printed onto the printable area PA within the printable area perimeter P of a particular item of merchandise.

Notably, a print dieline PD may include nonlinear contours such as (and not limited to) those shown in FIGS. 3 and 7, e.g., the hat's print dieline PD includes an elongated upright semicircle. That is, the print dielines PD are not limited to polygonal shapes formed only by line segments connected at vertices. In fact, it is well known that different types of merchandise may include a wide variety of differently shaped printable area perimeters P that include many nonlinear contours, and as such, the print dielines PD also will include such nonlinear contours.

This is a distinguishing factor between the print dielines PD created and utilized by the system 10 and the aspect ratio and/or paper size assistance lines that may exist in prior art. The aspect ratio and/or paper size assistance lines provided by the prior art are rectangular, e.g., to represent aspect ratios such as 3:2, 4:3, 4:5, 16:9, etc., and/or to represent standard paper sizes such as 4"×6", 8"×10", 5"×7", 8.5"×11", etc. In this case, the assistance lines are preprogrammed into the camera's operating software, and include cardinal vertices connected to one another using linear lines. Even when the prior art allows a user to enter a desired aspect ration and/or paper size, the assistance lines are generated by the camera's software by laying out the vertices and connecting the vertices together with linear lines. In this way, the assistance lines of the prior art are polygonal, i.e., rectangular.

In sharp contrast, the system 10 provides print dielines PD of any shape and with any nonlinear elements and contours as required by the printable area perimeters P of the merchandise being used.

Figure 15:
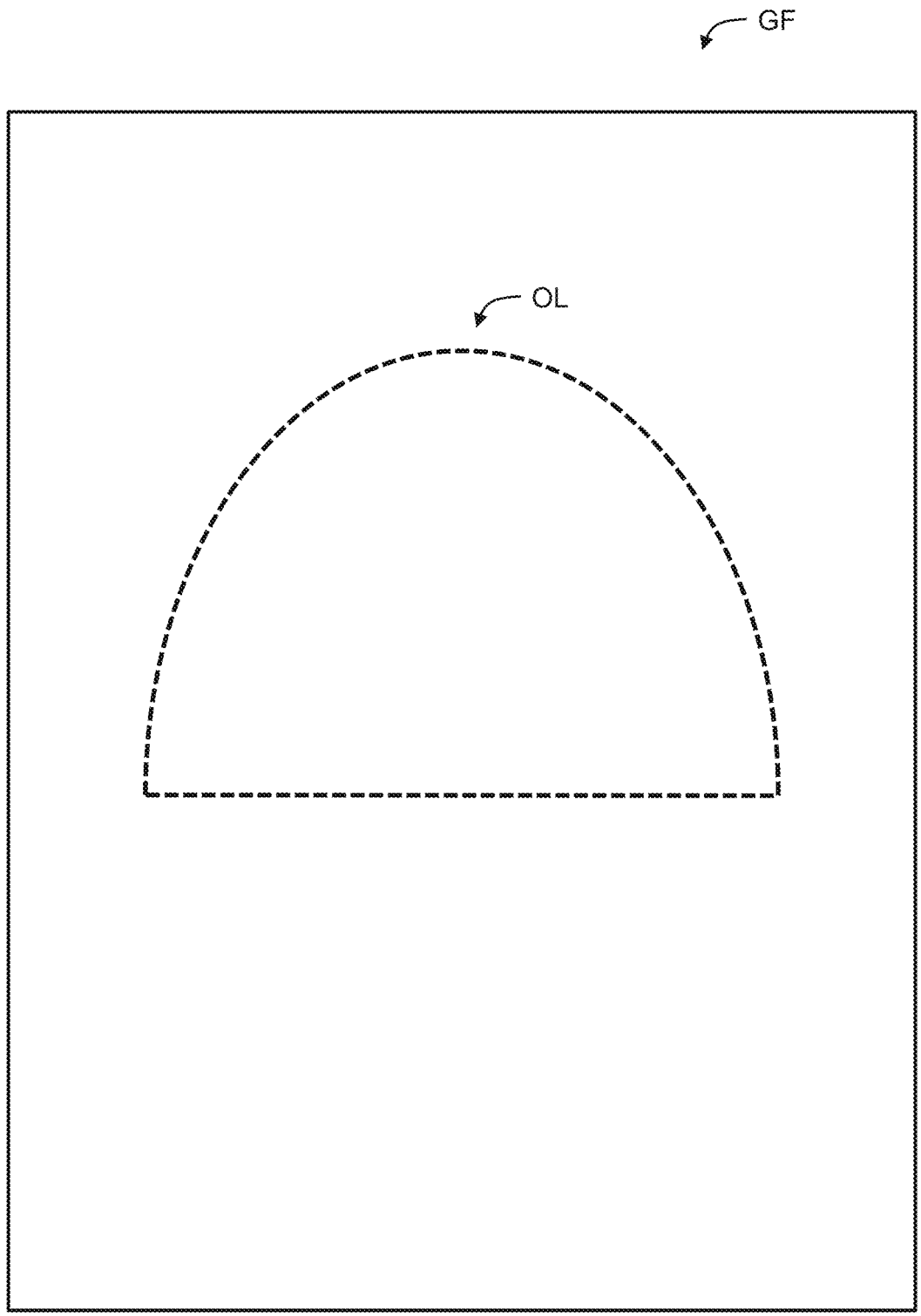
FIG. 15 shows aspects of a graphic file according to exemplary embodiments hereof.

To accomplish this, the system 10 is designed to derive any particularly shaped print dieline PD for any particularly shaped printable area PA within any particularly shaped printable area perimeter P initially from a digital graphic file GF. The graphic file GF preferably includes an outline OL that matches the shape of the printable area perimeter P of the item of merchandise being printed upon. For example, an example graphic file GF for the hat in the above examples is shown in FIG. 15. As shown, the graphic file GF includes an outline OL that matches the shape of the printable area perimeter P of the hat (see also FIGS. 3 and 7). The background of the graphic file GF may be transparent, a solid color (e.g., white), and/or any adequate background. It may be preferable that the graphic file GF does not include any other elements that are not to be interpreted by the system 10 as representing the print dieline PD, however, other information within the graphic file GF also is contemplated such as informational content (e.g., text that describes the type of merchandise associated with the graphic file GF, dimensional proportions data, etc.) and other types of necessary content. The graphic file GF also may include metadata that includes this information as well as other relevant information regarding the file GF. It is appreciated that any type of merch may include its own corresponding graphic file GF including an outline OL that corresponds to its printable area PA within its printable area perimeter P, and that the system 10 may receive the graphic file GF and subsequently derive the merch's corresponding print dieline PD for use with the app 200 and otherwise. Accordingly, the system 10 may receive and derive a multitude of print dielines PD corresponding to a multitude of different types of merch for use with the system 10.

In some embodiments, the graphic file is digital and may be of any appropriate filetype, such as, without limitation, .jpeg, .png, .pdf, .tiff, .gif, .psd, .ai, other filetypes, and any combinations thereof. In this way, a provider of the merchandise also may provide the digital graphic file of the merchandise's printable area perimeter P to the system 10, e.g., by uploading it to the system's backend 100.

In some embodiments, the system 10 receives the graphic file GF and overlays the digital contents of the graphic file GF (e.g., the outline OL matching the merch's printable area perimeter P) onto the display 304 of the device 300 during use. In this way, the system 10 transforms the graphic file GF into a print dieline PD for use with the system 10 as described herein.

In some embodiments, the outline OL also matches the specific dimensions of the merch's printable area perimeter P. In this case, the system 10 may overlay the outline OL directly onto the camera's display 304 with a 1:1 proportion. In other embodiments, the dimensions of the outline OL are proportional to the dimensions of the merch's printable area perimeter P. In this case, the proportionality of the outline OL may be included in the graphic file GF, in metadata associated with the graphic file GF, and/or may be provided to the system 10 using other suitable means. For example, the outline OL may be one-half its actual size required during printing, and as such, the system 10 may double it in size during use. Then, the system 10 may utilize the proportionality information to scale up or scale down the outline OL and overlay the scaled OL onto the camera's display 304.

Given the above, the forms and curvatures of the custom (and potentially nonlinear) print dielines PD do not need to be programmed and/or interpolated from coordinates, curve fitted, etc. by the camera's software but are instead derived directly from the graphic file GF.

Cropping

In some embodiments, once the portion of the subject media within the print dieline PD is ready for printing, the system 10 facilitates the printing of this subject media portion onto the printable area PA of the item of merchandise. In some embodiments, this includes the system 10 cropping out the portion within the print dieline PD and communicating the portion to a printing system to be printed.

In some embodiments, the system 10 correlates the area on the camera display 304 defined by the print dieline PD (e.g., the portion of the captured photograph within the print dieline PD) with the display's 304's pixel resolution and the desired dimensions of the final printout on the merch's printable area PA. In this way, the portion within the print dieline PD is printed at the correct size to match the merch's printable area PA.

For example, in some embodiments, the system 10 determines the camera display's 304's resolution, e.g., the system 10 determines the height and width in pixels thereby determining the number of rows and columns of pixels that make up the image (the captured photograph) on the display 304. In addition (e.g., after overlaying the print dieline PD on top of the display 304 or otherwise) the system 10 determines the amount of the display 304 that the width and height of the print dieline PD overlaps at each pixel row and column. Knowing this, the system 10 may then crop out the portion of the displayed captured photograph inside the print dieline PD and communicate it to the printing system to print. This cropped portion also may be used when creating the digital mockups of the merchandise as described herein.

In some embodiments, the system 10 adds a bleed to the cropped portion of the image for printing purposes, e.g., prior to communicating the image to the printing. For example, in some embodiments, the system 10 expands the area of the image within the print dieline PD outward in all directions and captures the expanded image to print. In this way, the bleed may account for dimensional imperfections in the merch's printable area perimeter P and/or printable area PA, e.g., if the merch's printable area perimeter P is slightly larger than expected, the bleed will cover the extra space with the extra portion of the image provided by the bleed. In some embodiments, the bleed may extend outward the border of the image within the print dieline PD by about ⅛", ¼", and/or by any suitable amount.

In some embodiments, the system 10 may not necessarily crop out the portion of the image to be printed and may instead simply identify the portion of the image to be printed, e.g., by printing the print dieline PD over the image so that the portion shown within the print dieline PD is understood by the printer (e.g., the person operating the printer) to be the portion that is to be printed onto the merch. In some embodiments, the system 10 may print an outer bleed line instead of the printed dieline PD thereby giving the printer the added space of the bleed to accommodate any slight inconsistencies with the dimensions of the merch's printable area PA.

System Architecture

Further details of the system's architecture are described below.

Figure 16:
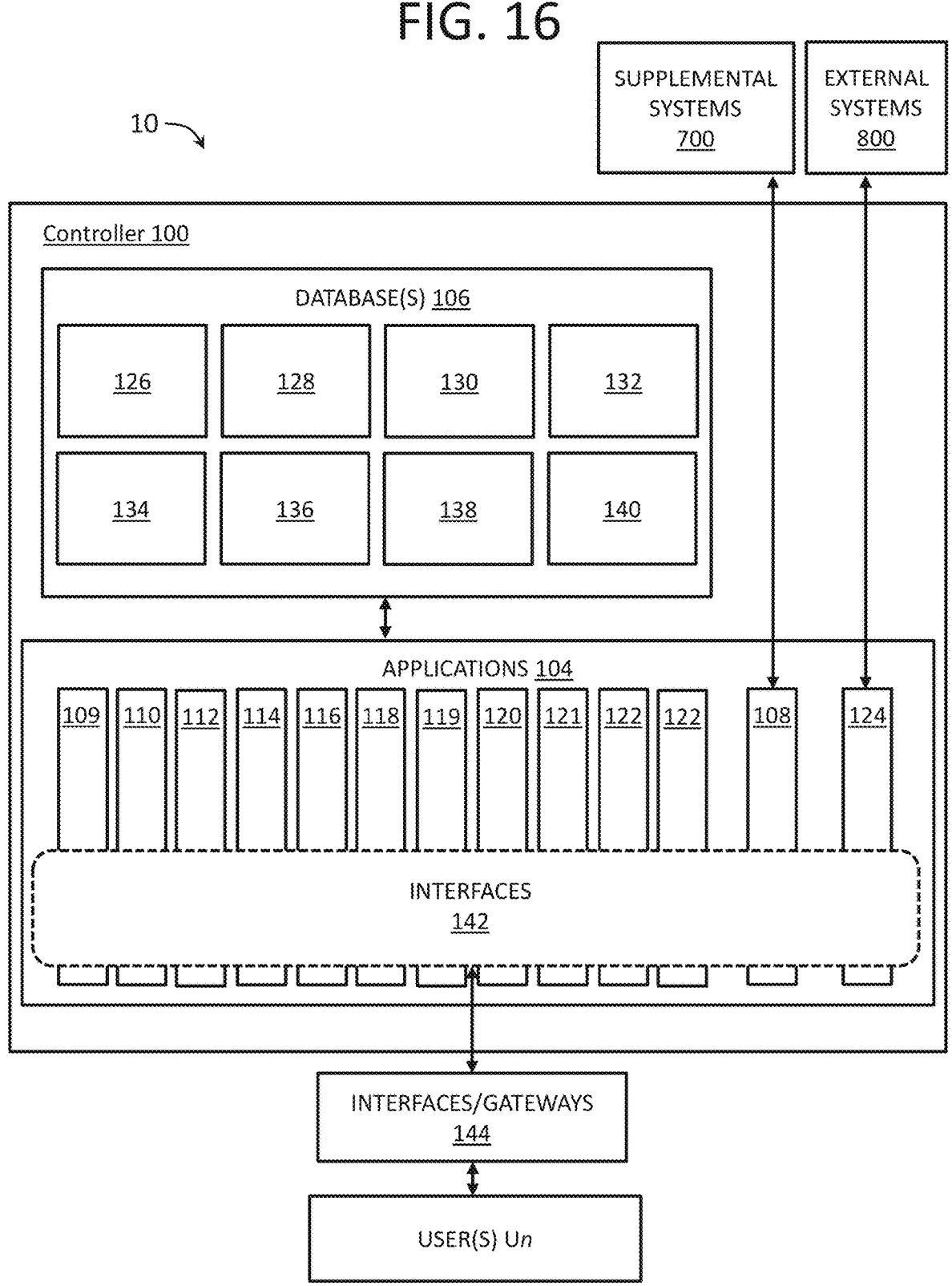
FIG. 16 shows aspects of a media capture and merchandise production system according to exemplary embodiments hereof.

FIG. 16 shows aspects of an exemplary media transformation system 10 of FIG. 1. As shown, the system 10 and backend system 100 may comprise various internal applications 104 and one or more databases 106, described in greater detail below. The internal applications 104 may generally interact with the one or more databases 106 and the data stored therein.

In some embodiments, one or all of the applications 104 and/or databases 106 may reside on the backend system 100. In other embodiments, one or all of the applications 104 and/or databases 106 (as shown in FIG. 11) may be incorporated into the mobile application 200 and reside on the user's device 300. In other embodiments, one or all of the applications 104 and/or databases 106 may reside on the backend system 100 and be incorporated into the mobile application 200 and reside on the user's device 300 concurrently. For example, the facial recognition system 400 may include some applications 104 and/or databases 106 that may be incorporated into the mobile application 200 and some applications 104 and/or databases 106 that may reside on the backend system 100. In some embodiments, some of the applications 104 and/or databases 106 may include native applications (or at least portions of native applications) that may reside on the user's device 300.

Accordingly, it is understood that various functionalities of the system 10 may be performed by the controller 100 as described herein, and that all or some of the same functionalities also may be performed by the mobile application 200. In some embodiments, the controller 100 and the mobile application 200 may work together in sharing and/or otherwise performing the functionalities of the system 10 as described. It also is understood that native applications (e.g., the device's native camera application) that may reside on the device 300 may be used and/or controlled by the application 200, backend 100 and/or overall system 10.

The database(s) 106 may comprise one or more separate or integrated databases, at least some of which may be distributed. The database(s) 106 may be implemented in any manner, and, when made up of more than one database, the various databases need not all be implemented in the same way. It should be appreciated that the system is not limited by the nature or location of database(s) 106 or by the manner in which they are implemented.

Each of the internal applications 104 may provide one or more services via an appropriate interface. Although shown as separate applications 104 for the sake of this description, it is appreciated that some or all of the various applications 104 may be combined. The various applications 104 may be implemented in any manner and need not all be implemented in the same way (e.g., using the same software languages, interfaces or protocols).

In some embodiments, the applications 104 may include one or more of the following applications 104:

1. Data intake application(s) 108: Generally used to upload user information, media assets, order information and other information from the mobile application 200 to the backend 100.
2. Print dieline application(s) 109: Generally used to receive, define, overlay, manipulate, modify and/or otherwise utilize the print dielines PD in conjunction with the device's camera 302, display 304, merchandise templates 310, digital mock-ups 312, design templates, and/or other elements of the system 10.
3. Media transformation application(s) 110: Generally used to transform the subject media per the user's actions and preferences. The media transformation application 110 may be incorporated with the media transformation system 500 and/or the mobile application 200.
4. Image recognition application(s) 112: Generally used to recognize objects and faces within the subject media. The image recognition application may be incorporated into the image (and facial) recognition system 400.
5. Geolocation application(s) 114: Generally used to locate the user Un and to recommend landmarks and other locations of interest to the user Un. The geolocation application 114 may be incorporated into the geolocation application 600.
6. Machine learning application(s) 116: Generally used to learn the user's preferences as described above.
7. Data output application(s) 118: Generally used to output order information to supplemental system 700 (e.g., production facilities, fulfilment centers, etc.) and/ or to external systems 800 (retail outlets, logistic providers, etc.).
8. Order management application(s) 119: Generally used to manage relevant information regarding orders placed by the users Un of the system 10.

9. Payment management application(s) 120: Generally used for fee collection and payment processing for orders taken.
10. Order fulfillment application(s) 121: Generally used to manage the fulfillment of each order placed with the system 10.
11. Inventory management application(s) 122: Generally used to track and manage inventory of merchandise provided by the system 10.
12. Promotion (campaign) management application(s) 124: Generally used to track and manage all promotions run through the system 10 as described in other sections.

The applications 104 also may include other applications and/or auxiliary applications (not shown). Those of ordinary skill in the art will appreciate and understand, upon reading this description, that the above list of applications is meant for demonstration and that the system 10 may include other applications that may be necessary for the system 10 to generally perform its functionalities as described in this specification. In addition, as should be appreciated, embodiments or implementations of the system 10 need not include all of the applications listed, and that some or all of the applications may be optional. It is also understood that the scope of the system 10 is not limited in any way by the applications that it may include.

In some embodiments, the database(s) 106 may include one or more of the following databases:
1. User profile database(s) 126: generally used to store information regarding each user Un.
2. Media database(s) 128: generally used to store media assets for each user Un.
3. Image recognition database(s) 130: generally used to store information in support to the image recognition application 112 and/or image recognition system 400.
4. Historical data database(s) 132: generally used to store historical data (e.g., photographs, edits, orders, etc.) for each user Un.
5. Machine learning database(s) 134: generally used to store learned information pertaining to the user's preferences as described in other sections.
6. Inventory management database(s) 136: generally used to store information regarding the inventory levels of the merchandise provided by the system 10.
7. Promotional (campaign) management database(s) 138: generally used to store information pertaining to each promotion run through the system 10 as described in other sections.
8. Miscellaneous and/or auxiliary database(s) 140.

It is understood that the above list of databases is meant for demonstration and that the system 10 may include some or all of the databases, and also may include additional databases as required. It is also understood that the scope of the system 10 is not limited in any way by the databases that it may include.

Various applications 104 and databases 106 in the media transformation system 10 may be accessible via interface(s) 142. These interfaces 142 may be provided in the form of application programming interfaces (APIs) or the like and made accessible to external users Un via one or more gateways and interfaces 144 (e.g., via a web-based application 200 and/or a mobile application 200 running on a Food Vendor and/or user's device 300).

In one exemplary embodiment hereof, each user Un that wishes to utilize the system 10 may provide User Profile Data to the system 10 (e.g., via the data intake application 108) and its databases 106 (e.g., user profile database 126).

Backend Controller

The backend controller 100 may include one or more servers (such as Internet servers) and may include all of the components (hardware and software) necessary to store system data, transmit data to and receive data from the mobile applications 200 and the users' devices 300, to store the data (e.g., in database(s)), and to analyze or otherwise process the data it may receive, transmit and/or store. For example, the backend controller 100 may include a CPU, microprocessor, microcontroller, chipset, control board, RAM, general memory, network boards, power supplies, an operating system, software, applications, scripts and any other component, application, mechanism, device or software as required. The backend controller 100 may interact with the mobile applications 200, and the mobile applications may interact with the backend controller 100, through a network 102 (e.g., the Internet, LAN, WAN or other type of network 102).

The backend controller 100 may receive data from the mobile apps 200 and/or the users' devices 300, may store the data in a database or in other types of data-filing architectures within its memory, and may transform the data according to the user preferences. The backend controller 100 also may download data to another platform or facility where the data may be stored, analyzed, or otherwise evaluated, used for production and/or generally processed.

The cloud platform 300 may receive data from and/or transmit data to one or more mobile apps 200 and/or one or more users' devices 300 at a time, simultaneously and in real-time. In this way, any number of mobile apps 200 and any number of users' devices 400 may be configured, controlled and monitored simultaneously by one or more backend controllers 100. Each mobile app 200 instance and/or each user device 400 may have a unique identifier (such as a serial number, IP address or other type of unique identifier) and that the controller 100 may recognize each unique identifier to communicate with each app 200 and/or user device 300 individually.

Computing

The functionalities, applications, services, mechanisms, operations, and acts shown and described above are implemented, at least in part, by software running on one or more computers (e.g., the controller assembly 100).

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed computers, special purpose computers and computing devices. One or more such computers or computing devices may be referred to as a computer system.

Figure 17:
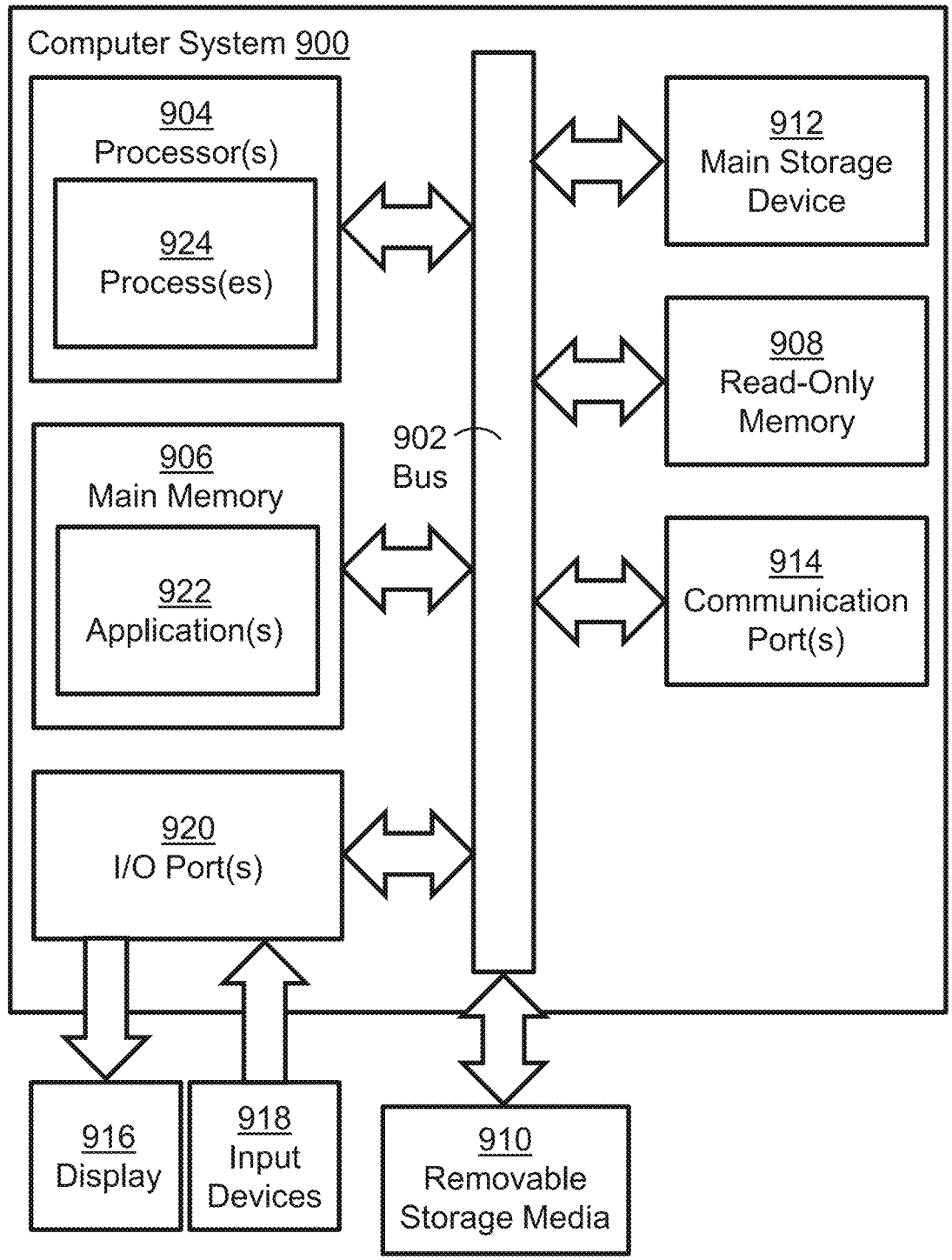
FIG. 17 depicts aspects of a computing system according to exemplary embodiments hereof.

FIG. 17 is a schematic diagram of a computer system 900 upon which embodiments of the present disclosure may be implemented and carried out.

According to the present example, the computer system 900 includes a bus 902 (i.e., interconnect), one or more processors 904, a main memory 906, read-only memory 908, removable storage media 910, mass storage 912, and one or more communications ports 914. Communication port(s) 914 may be connected to one or more networks (not shown) by way of which the computer system 900 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 904 can be any known processor, such as, but not limited to, an Intel® Itanium® or Itanium 2® processor(s), AMD® Opteron® or Athlon MP® processor(s), or Motorola® lines of processors, and the like. Communications port(s) 914 can be any of an Ethernet port, a Gigabit port using copper or fiber, or a USB port, and the like. Communications port(s) 914 may be chosen depending on a network such as a Local Area Network (LAN), a Wide Area Network (WAN), or any network to which the computer system 900 connects. The computer system 900 may be in communication with peripheral devices (e.g., display screen 916, input device(s) 918) via Input/Output (I/O) port 920.

Main memory 906 can be Random Access Memory (RAM), or any other dynamic storage device(s) commonly known in the art. Read-only memory (ROM) 908 can be any static storage device(s) such as Programmable Read-Only Memory (PROM) chips for storing static information such as instructions for processor(s) 904. Mass storage 912 can be used to store information and instructions. For example, hard disk drives, an optical disc, an array of disks such as Redundant Array of Independent Disks (RAID), or any other mass storage devices may be used.

Bus 902 communicatively couples processor(s) 904 with the other memory, storage and communications blocks. Bus 902 can be a PCI/PCI-X, SCSI, a Universal Serial Bus (USB) based system bus (or other) depending on the storage devices used, and the like. Removable storage media 910 can be any kind of external storage, including hard-drives, floppy drives, USB drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements which are appropriate to perform the methods.

As shown, main memory 906 is encoded with application(s) 922 that support(s) the functionality as discussed herein (the application(s) 922 may be an application(s) that provides some or all of the functionality of the services/mechanisms described herein. Application(s) 922 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 904 accesses main memory 906 via the use of bus 902 in order to launch, run, execute, interpret or otherwise perform the logic instructions of the application(s) 922. Execution of application(s) 922 produces processing functionality of the service related to the application(s). In other words, the process(es) 924 represent one or more portions of the application(s) 922 performing within or upon the processor(s) 904 in the computer system 900.

It should be noted that, in addition to the process(es) 924 that carries (carry) out operations as discussed herein, other embodiments herein include the application 922 itself (i.e., the un-executed or non-performing logic instructions and/or data). The application 922 may be stored on a computer readable medium (e.g., a repository) such as a disk or in an optical medium. According to other embodiments, the application 922 can also be stored in a memory type system such as in firmware, read only memory (ROM), or, as in this example, as executable code within the main memory 906 (e.g., within Random Access Memory or RAM). For example, application(s) 922 may also be stored in removable storage media 910, read-only memory 908, and/or mass storage device 912.

Those of ordinary skill in the art will understand that the computer system 900 can include other processes and/or software and hardware components, such as an operating system that controls allocation and use of hardware resources.

As discussed herein, embodiments of the present invention include various actions or operations. A variety of these actions may be performed by hardware components or may be embodied in machine-executable instructions, which may be used to cause a general-purpose or special-purpose processor programmed with the instructions to perform the operations. Alternatively, the actions may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

It is understood that any aspect or detail of any embodiment described herein or otherwise may be combined with any other aspect or detail of any other embodiment to form an additional embodiment that also is within the scope of the system 10.

Where a process is described herein, those of ordinary skill in the art will appreciate that the process may operate without any user intervention. In another embodiment, the process includes some human intervention (e.g., an action is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A method comprising:
   (A) receiving, by a computing system, a digital print dieline corresponding to a physical printable area on an article of merchandise;
   (B) digitally overlaying, by an application, the digital print dieline onto a camera display wherein the digital print dieline is positioned in an interior portion of the camera display;

(C) causing, by the application, a camera associated with the camera display to capture an entire digital image displayed on the camera display and to store the captured entire digital image as a first stored image;

(D) displaying on the camera display, by the application, the first stored image and the overlaid digital print dieline;

(E) identifying, by the application, a portion of the first stored image displayed on the camera display and within the digital print dieline; and (F) communicating, by the application, the portion of the first stored image identified in (E) and an indication of the digital print dieline to a printing system.

2. The method of claim 1 further comprising:

(G) printing, using the printing system, the communicated portion of the first stored image onto the physical printable area of the article of merchandise.

3. The method of claim 1 further comprising:

(D)(1) cropping out, by the application, the portion of the first stored image identified in (E), wherein the indication of the digital print dieline in (F) includes the cropped out portion.

4. The method of claim 1 wherein the digital print dieline received in (A) includes a graphic file.

5. The method of claim 4 wherein the graphic file includes a digital outline corresponding to the physical printable area on the article of merchandise.

6. The method of claim 1 wherein the digital print dieline includes at least one nonlinear contour.

7. The method of claim 1 further comprising:

(D)(1) enabling, by the application, the first stored image displayed on the camera display to be adjusted with respect to the overlaid digital print dieline.

8. The method of claim 7 wherein the first stored image is enabled to be moved, rotated, and/or adjusted in size with respect to the overlaid digital print dieline.

9. The method of claim 1 wherein the article of merchandise includes at least one of a backpack, a shirt, a hat, a mask, a tote bag, a pair of pants, a pair of shorts, a messenger bag, a sports/overnight bag, a lunchbox, a guitar case, a sock, a phone case, a keychain, a postcard, a poster, a picture book, onesie, a bib, purse, a mug, a water bottle, and an apron.

10. A system comprising:

one or more processors; and a memory coupled to the processors comprising instructions executable by the processors, the processors being operable when executing the instructions to perform operations comprising:

(A) receiving a digital print dieline corresponding to a physical printable area on an article of merchandise;

(B) digitally overlaying the digital print dieline onto a camera display wherein the digital print dieline is positioned in an interior portion of the camera display;

(C) causing a camera associated with the camera display to capture an entire digital image displayed on the camera display and to store the captured entire digital image as a first stored image;

(D) displaying the first stored image and the overlaid digital print dieline on the camera display;

(E) identifying a portion of the first stored image displayed on the camera display and within the digital print dieline; and (F) communicating the portion of the first stored image identified in (E) and an indication of the digital print dieline to a printing system.

11. The system of claim 10, the operations further comprising:

(F) controlling the printing system to print the communicated portion of the first stored image onto the physical printable area of the article of merchandise.

12. The system method of claim 10, the operations further comprising:

(D)(1) cropping out the portion of the first stored digital image identified in (E), wherein the indication of the digital print dieline in (F) includes the cropped out portion.

13. The system of claim 10 wherein the digital print dieline received in (A) includes a graphic file.

14. The system of claim 13 wherein the graphic file includes a digital outline corresponding to the physical printable area on the article of merchandise.

15. The method of claim 10 wherein the digital print dieline includes at least one nonlinear contour.

16. The system of claim 10, the operations further comprising:

(D)(1) enabling the first stored image displayed on the camera display to be adjusted with respect to the overlaid digital print dieline.

17. The system of claim 16 wherein the first stored image is enabled to be moved, rotated, and/or adjusted in size with respect to the overlaid digital print dieline.

18. The system of claim 10 wherein the article of merchandise includes at least one of a backpack, a shirt, a hat, a mask, a tote bag, a pair of pants, a pair of shorts, a messenger bag, a sports/overnight bag, a lunchbox, a guitar case, a sock, a phone case, a keychain, a postcard, a poster, a picture book, onesie, a bib, purse, a mug, a water bottle, and an apron.

19. A method comprising:

(A) receiving, by a computing system, a digital print dieline corresponding to a physical printable area on an article of merchandise;

(B) digitally overlaying, by an application, the digital print dieline onto a camera display wherein the digital print dieline is positioned in an interior portion of the camera display;

(C) causing, by the application, a camera associated with the camera display to capture an entire digital image displayed on the camera display and to store the captured entire digital image as a first stored image;

(D) displaying on the camera display, by the application, the first stored image and the overlaid digital print dieline;

(E) identifying, by the application, a portion of the first stored image displayed on the camera display and within the overlaid digital print dieline;

(F) adding, by the application, a bleed to the portion of the first stored image identified in (E); and (G) communicating to a printing system, by the application, the portion of the first stored image identified in (E) plus the bleed and an indication of the digital print dieline.

20. The method of claim 19 further comprising:

(D)(1) enabling, by the application, the first stored image displayed on the camera display to be moved, rotated, and/or adjusted in size with respect to the overlaid digital print dieline.

* * * * *